(12) United States Patent
Sanada et al.

(10) Patent No.: US 7,835,433 B2
(45) Date of Patent: *Nov. 16, 2010

(54) MULTIPLE RECEIVING DEVICES DETERMINING THE SAMPLING RATE FOR RECEIVED SIGNALS USING A PLURALITY OF SAMPLING RATES

(75) Inventors: Yukitoshi Sanada, Tokyo (JP); Hideki Yokoshima, Kanagawa (JP); Masayoshi Abe, Tokyo (JP); Yuya Kondo, Kanagawa (JP); Mario Tokoro, Tokyo (JP)

(73) Assignee: Sony Corporation, Tokyo (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/871,013

(22) Filed: Oct. 11, 2007

(65) Prior Publication Data

US 2008/0219328 A1 Sep. 11, 2008

(30) Foreign Application Priority Data

Oct. 12, 2006 (JP) ............................ 2006-278353

(51) Int. Cl.
  *H03H 7/30* (2006.01)
(52) U.S. Cl. ...................................... 375/230; 375/147
(58) Field of Classification Search ................. 375/147, 375/230
  See application file for complete search history.

(56) References Cited

U.S. PATENT DOCUMENTS

| | | | | |
|---|---|---|---|---|
| 3,862,373 | A * | 1/1975 | Cohen et al. ................. | 370/299 |
| 4,755,795 | A * | 7/1988 | Page ............................ | 341/51 |
| 6,211,924 | B1 * | 4/2001 | Patel et al. ................... | 348/726 |
| 6,243,430 | B1 * | 6/2001 | Mathe ......................... | 375/346 |
| 6,487,193 | B1 | 11/2002 | Hamada et al. | |

(Continued)

FOREIGN PATENT DOCUMENTS

JP 38737396 8/2006

(Continued)

OTHER PUBLICATIONS

Honary, "Adaptive-Rate Sampling Applied to the Efficient Encoding of Speech Waveforms" National Conference on Telecommunications, York, Apr. 2-5, 1989, London IEE, vol. CONF 2, Apr. 2, 1989, pp. 352-357.*

(Continued)

*Primary Examiner*—Juan A Torres
(74) *Attorney, Agent, or Firm*—Finnegan, Henderson, Farabow, Garrett & Dunner, L.L.P.

(57) ABSTRACT

A receiver apparatus is disclosed. The receiver apparatus includes a plurality of signal receiving devices and a plurality of channel signal outputting devices for sampling signals received by the signal receiving devices at sampling rates switched within a predetermined range or between multiple values and outputting channel signals. The receiver apparatus also includes control devices for controlling the sampling rates in the channel signal outputting devices. The receiver apparatus also includes response estimating devices for estimating responses on the basis of the channel signals output from the channel signal outputting devices. The receiver apparatus also includes evaluating devices for evaluating reception characteristics on the basis of the responses estimated by the response estimating devices. The receiver apparatus further includes determining devices for determining the sampling rates in the channel signal outputting devices on the basis of the reception characteristics at the multiple sampling rates evaluated by the evaluating devices.

15 Claims, 21 Drawing Sheets

U.S. PATENT DOCUMENTS

| | | | |
|---|---|---|---|
| 7,248,189 B2 * | 7/2007 | Sinha et al. | 341/61 |
| 7,480,324 B2 * | 1/2009 | Aiello et al. | 375/130 |
| 7,656,970 B1 * | 2/2010 | Sankabathula et al. | 375/316 |
| 2001/0050953 A1 * | 12/2001 | Kempf | 375/240 |
| 2002/0009161 A1 * | 1/2002 | Ratni et al. | 375/316 |
| 2003/0103584 A1 * | 6/2003 | Bjerke et al. | 375/340 |
| 2003/0123408 A1 | 7/2003 | Saitou | |
| 2003/0179018 A1 * | 9/2003 | Ballantyne et al. | 327/91 |
| 2004/0013218 A1 | 1/2004 | Kouyama | |
| 2004/0037351 A1 * | 2/2004 | Itoh | 375/149 |
| 2004/0120411 A1 * | 6/2004 | Walton et al. | 375/260 |
| 2004/0139466 A1 | 7/2004 | Sharma et al. | |
| 2006/0114858 A1 * | 6/2006 | Walton et al. | 370/335 |

FOREIGN PATENT DOCUMENTS

WO     WO 2006/055718 A2     5/2006

OTHER PUBLICATIONS

K. J. Kim et al., "Effect of Tap Spacing on the Performance of Direct-Sequence Spread Spectrum RAKE Receiver," IEEE Trans. on Commun., vol. 48, No. 6, Jun. 2000.

C. Tepedelenlioglu et al., "Low Complexity Multipath Diverstly Through Fractional Sampling in OFDM," IEEE Trans. on Signal Processing. vol. 52, No. 11, Nov. 2004.

Tu Chunjian et al., "The Design of 501.11b WLAN Baseband Processor," Proceedings. $5^{th}$ International Conference on ASIC, 2003. vol. 2, pp. 852-855, Oct. 2003.

J. Mitsugi et al., Path-Search Algorithm Introducing Path-Management Tables for a DS-CDMA Mobile Terminal, Proceeding. The $13^{th}$ IEEE International Symposium on Personal, Indoor and Mobile Radio Communications, vol. 2, pp. 730-734, Sep. 2002.

H. Hamada et al., "Performance Evaluation of the Path Search Process for the W-CDMA System," Processing. 1999 IEEE $49^{tv}$ Vehicular Technology Conference, Vo. 2, pp. 980-984, May 1999.

M. Isaka, "Coding and Modulation for MIMO Channels", IEICE, Fundamentals of Electronics, Communications and Computer Sciences, vol. J86-A, No. 12, pp. 1292-1300, Dec. 2003.

* cited by examiner

OUTPUT WAVEFORM OF CORRELATION FILTER IN THE CASE OF 4 IMPULSE SIGNAL INPUTS

SAMPLING POINT IN THE CASE OF TWO SAMPLES/CHIP

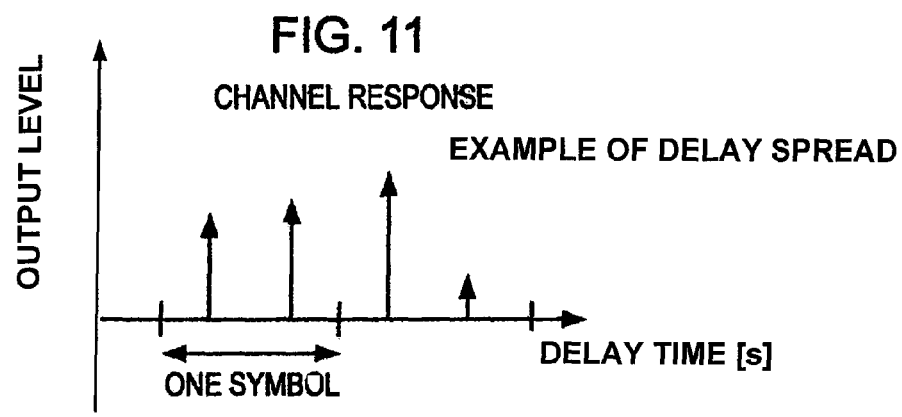
FIG. 11
CHANNEL RESPONSE
EXAMPLE OF DELAY SPREAD
FREQUENCY RESPONSE IN THE CASE OF ONE SAMPLE/SYMBOL
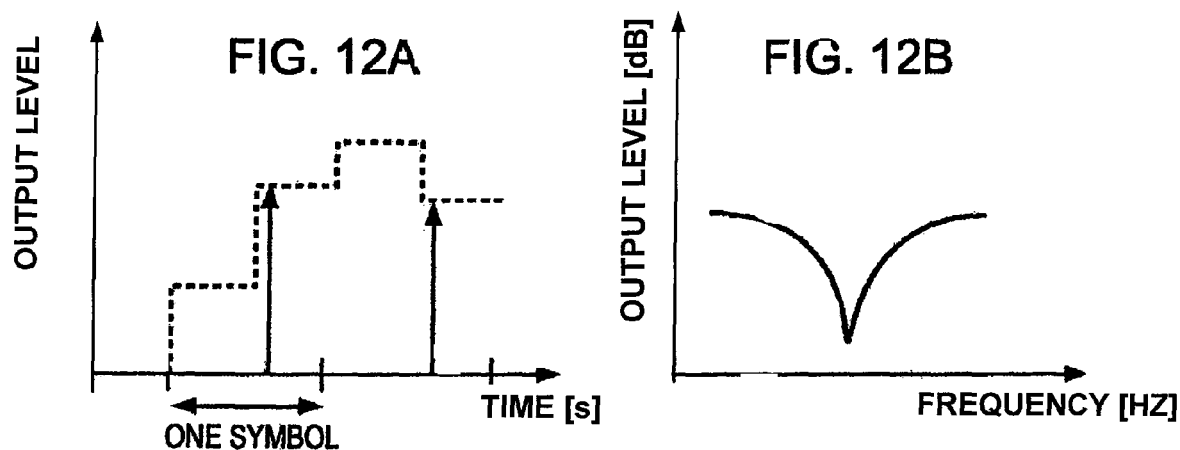
FIG. 12A
FIG. 12B

FREQUENCY RESPONSE IN THE CASE OF TWO SAMPLES/SYMBOL

MULTIPLE RECEIVING DEVICES DETERMINING THE SAMPLING RATE FOR RECEIVED SIGNALS USING A PLURALITY OF SAMPLING RATES

CROSS REFERENCES TO RELATED APPLICATIONS

The present invention contains subject matter related to Japanese Patent Application JP 2006-278353 filed in the Japanese Patent Office on Oct. 12, 2006, the entire contents of which are incorporated herein by reference.

BACKGROUND OF THE INVENTION

1. Field of the Invention

The present invention relates to receiver apparatuses, receiving methods, programs, and recording media. More particularly, the present invention relates to a receiver apparatus, a receiving method, a program, and a recording medium, which are capable of improving the reception characteristics.

2. Description of the Related Art

Hitherto, fractional sampling or over-sampling in which a signal corresponding to one symbol is sampled multiple times are proposed for wireless receiver apparatuses.

For example, tradeoff between sampling intervals and characteristics in Direct Sequence Spread Spectrum (DS/SS) modulation methods (for example, refer to K. J. Kim, S. Y. Kwon, E. K. Hong, and K. C. Whang, June 2000, "Effect of Tap Spacing on the Performance of Direct-Sequence Spread-Spectrum RAKE Receiver", IEEE Trans. on Commun., Vol. 48, No. 6) and effects of diversity by the fractional sampling in Orthogonal Frequency Division Multiplexing (OFDM) modulation methods (for example, refer to C. Tepedelenlioglu and R. Challagulla, November 2004, "Low Complexity Multipath Diversity through Fractional Sampling in OFDM", IEEE Trans. on Signal Processing, Vol. 52, No. 11) have been already discussed. The discussion has showed that an increase in the sampling rate improves the characteristics.

Mechanisms of estimating channel responses after over-sampling reception signals to detect appropriate despread timing have been proposed for receiver apparatuses in Code Division Multiple Access (CDMA) systems (for example, refer to Tu Chunjiang, Zhou Xin, Liu Bo, and Chen Hongyi, October 2003, "The design of 802.11b WLAN baseband processor", Proceedings. 5th International Conference of ASIC, 2003, Vol. 2, 852-855).

Such a mechanism is exemplified by a method using sliding correlation (for example, refer to US Patent Publication No. US2003/0123408 "CDMA Receiving Apparatus"; US Patent Publication No. US2004/0139466 "Finger Allocation for a Path Searcher in A Multipath Receiver"; and J. Mitsugi, M. Mukai, and H. Tsurumi, September 2002, "Path-search algorithm introducing path-management tables for a DS-CDMA mobile terminal", Proceedings. The 13th IEEE International Symposium on Personal, Indoor and Mobile Radio Communications, Vol. 2, 730-734). FIG. 1 is a block diagram showing an example of the configuration of a receiver apparatus 1 receiving signals by a channel response estimation method by using the sliding correlation.

Referring to FIG. 1, a received signal is input in a sliding correlator 11. The sliding correlator 11 multiplies the received signal by a spread code having a phase T, supplied from a spread code generator 12. The signal resulting from the multiplication is supplied to an integrator 13. The integrator 13 integrates the signal with respect to the period of one spread code, and the integrated signal is supplied to a square circuit 14. The square circuit 14 detects a channel response corresponding to the phase T. The output from the square circuit 14 is supplied to a channel response estimator 15. The channel response estimator 15 estimates the entire channel response corresponding to different phases other than the phase T.

The above mechanism is exemplified by another method using correlation (for example, refer to H. Hamada, M. Nakamura, T. Kubo, M. Minowa, and Y. Oishi, May 1999, "Performance evaluation of the path search process for the W-CDMA system", Proceedings. 1999 IEEE 49th Vehicular Technology Conference, Vol. 2, 980-984 and US Patent Publication No. US2004/0013218 "Receiving Device and Receiving Method"). FIG. 2 is a block diagram showing an example of the configuration of a receiver apparatus 21 estimating a channel response by using the correlation.

Referring to FIG. 2, a received signal subjected to over-sampling in an analog-to-digital (A/D) converter (not shown) is input in a decimator 31 where the signal is downsampled at appropriate sampling intervals. The output from the decimator 31 is supplied to a correlation filter 32 where correlation processing (matched filtering) is performed. If the received signal has predetermined correlation, the output from the correlation filter 32 directly represents a channel response. Accordingly, a channel response estimator 33 estimates the entire channel response on the basis of the output from the correlation filter 32. It is possible to estimate the channel response in a short time by this method.

The mechanism is further exemplified by a method using multiple correlators (for example, refer to U.S. Pat. No. 6,487,193 "Path Searched Device and CDMA Receiver with the Same"). FIG. 3 is a block diagram showing an example of the configuration of a receiver apparatus 41 capable of using two correlation filters to estimate individual channel responses only if necessary.

Referring to FIG. 3, a received signal is input in a decimator 51. The decimator 51 decimates the received signal at two decimation rates. The decimator 51 supplies a decimation output at a higher decimation rate (a lower degree of over-sampling) to a correlation filter 52 and supplies a decimation output at a lower decimation rate (a higher degree of over-sampling) to a correlation filter 53. The correlation filter 52 roughly estimates channel responses, and the operation of the correlation filter 53 is delayed for a necessary time by using the estimated result by the correlation filter 52 to estimate the channel responses in detail. A channel response estimator 54 estimates the entire channel response on the basis of the channel responses estimated by the correlation filter 53.

The technologies described above with reference to FIGS. 1 to 3 each detect the maximum value of the impulse response in one chip and does not detect two or more samples per chip.

In recent years, communication technologies using multiple antennas, such as Multiple Input Multiple Output (MIMO), Single Input Multiple Output (SIMO), and Multiple Input Single Output (MISO), have received widespread attention. For example, in the MIMO, both a transmitter apparatus and a receiver apparatus are provided with multiple antennas or multiple antenna elements (elements each including at least one antenna) to realize multiple transmission lines that are logically independent of each other. The receiver apparatus splits a received signal and simultaneously demodulates the signal to achieve both improvement in the frequency usage efficiency and reduction in the error rate owing to the effects of diversity (for example, refer to Motohiko Isaka, December 2003, "MIMO Tsushinro ni Okeru Fugouka to Hennchou (Coding and Modulation in MIMO Channel)", The Institute of Electronics, Information, and Communication Engineers (IEICE) Transactions A, Vol. J86-A, No. 12 1292-1302).

SUMMARY OF THE INVENTION

Studies have showed that an increase in the sampling rate improves the characteristics. However, for example, in the fractional sampling, it is necessary to increase the operation speed of the circuit in accordance with the degree of the fractional sampling, thus increasing the power consumption. When parallel signal processing is adapted, the area where the circuit is mounted is increased and the cost is also increased.

The increase in the power consumption, the area of the circuit, and the cost are not preferable to wireless terminals although the characteristics are improved.

The MIMO in the related art has the trouble in that many antenna elements are necessary to improve the reception characteristics, particularly at the receiver side. In recent years, it is necessary to provide portable information processing apparatuses and notebook-sized personal computers with functions for receiving a large amount of information by wireless communication, for example, a function of browsing a Web page by the wireless communication. Small wireless local area network (LAN) terminals or wireless LAN cards are necessary to achieve such functions. However, mounting many antenna elements in the small wireless LAN terminals or wireless LAN cards in order to improve the reception characteristics makes the reduction in the size of the apparatuses or cards difficult.

It is desirable to improve the reception characteristics of signals received through a predetermined number of antennas while reducing the increase in the power consumption, the area of the circuit, and the cost.

According to an embodiment of the present invention, a receiver apparatus includes a plurality of signal receiving means; a plurality of channel signal outputting means for sampling signals received by the plurality of signal receiving means at sampling rates switched within a predetermined range or between multiple values and outputting channel signals; control means for controlling the sampling rates in the plurality of channel signal outputting means; response estimating means for estimating responses on the basis of the channel signals output from the plurality of channel signal outputting means; evaluating means for evaluating reception characteristics on the basis of the responses estimated by the response estimating means; and determining means for determining the sampling rates in the plurality of channel signal outputting means on the basis of the reception characteristics at the multiple sampling rates evaluated by the evaluating means.

During a period when secondary information necessary for receiving main information is received before the main information is received, the control means may control the sampling rates in the plurality of channel signal outputting means so that the response estimating means estimates the responses at the multiple sampling rates, the response estimating means may estimate the responses at the multiple sampling rates in the plurality of channel signal outputting means, the evaluating means may evaluate the reception characteristics on the basis of the responses at the multiple sampling rates in the plurality of channel signal outputting means, and the determining means may determine a predetermined sampling rate at which each channel signal outputting means samples a signal corresponding to the main information, on the basis of the reception characteristics evaluated by the evaluating means. During a period when the main information is received, the control means may control the sampling rates in the plurality of channel signal outputting means so as to be the predetermined sampling rates.

The signals may be sampled at different sampling points at the different sampling rates in the plurality of channel signal outputting means.

The evaluating means may evaluate the reception characteristics in all the combinations of the multiple sampling rates in the plurality of channel signal outputting means. The determining means may determine a predetermined combination of the sampling rates in which the plurality of channel signal outputting means sample the signals corresponding to the main information on the basis of the reception characteristics evaluated by the evaluating means in all the combinations of the multiple sampling rates in the plurality of channel signal outputting means.

The determining means may determine a combination of the sampling rates having the highest evaluation value, among the values of the reception characteristics evaluated by the evaluating means in all the combinations of the multiple sampling rates in the plurality of channel signal outputting means, to be the combination of the sampling rates in which the plurality of channel signal outputting means sample the signals corresponding to the main information.

The determining means may compare the values of the reception characteristics in all the combinations of the multiple sampling rates in the plurality of channel signal outputting means, evaluated by the evaluating means, with a predetermined threshold value, and may determine a combination having the smallest amount of power consumption, among the combinations providing the evaluated values higher than the predetermined value, to be the combination of the sampling rates in which the plurality of channel signal outputting means sample the signals corresponding to the main information.

Each channel signal outputting means may include analog-to-digital converting means for oversampling the received signal and converting the signal into a digital signal and rate varying means for varying a rate of the digital signal resulting from the conversion by the analog-to-digital converting means and outputting the channel signal at the sampling rate controlled by the control means.

The receiver apparatus may further include demodulating means for demodulating the received signals on the basis of the responses estimated by the response estimating means.

The receiver apparatus may further include combination control means for controlling the number of fingers and a tap coefficient in RAKE combination on the basis of the responses estimated by the response estimating means.

The demodulating means may separate multiple signals transmitted through multiple antennas to demodulate the separated signals.

The receiver apparatus may further include combination control means for controlling a diversity factor on the basis of the responses estimated by the response estimating means.

According to another embodiment of the present invention, a receiving method for a receiver apparatus receiving signals with a plurality of signal receiving means including different antennas includes the steps of, during a period when signals corresponding to secondary information necessary for receiving main information are received before the main information is received, sampling the received signals corresponding to the secondary information, received through the antennas in the plurality of signal receiving means, at multiple sampling rates controlled so as to estimate responses at the multiple sampling rates; estimating the responses of the received signals corresponding to the secondary information sampled at the multiple sampling rates; evaluating reception characteristics at the multiple sampling rates of the received signals received by the plurality of signal receiving means on the basis of the estimated responses at the multiple sampling rates; and determining a predetermined sampling rate at which each signal receiving means samples the signal corresponding to the main information, on the basis of the evaluated reception characteristics. The method includes the steps of, during a period when signals corresponding to the main information are received, controlling the sampling rates at which the received signals corresponding to the main information are sampled so as to be the predetermined sampling rates determined for every signal receiving means and sampling the received signals corresponding to the main information, received through the multiple antennas in the plurality of signal receiving means, at the predetermined sampling rates.

According to another embodiment of the present invention, a computer-executable program controlling processing of received signals includes the steps of, during a period when signals corresponding to secondary information necessary for receiving main information are received before the main information is received, controlling sampling of the received signals corresponding to the secondary information, received through multiple antennas in a plurality of signal receiving means, at multiple sampling rates controlled so as to estimate responses at the multiple sampling rates; estimating the responses of the received signals corresponding to the secondary information sampled at the multiple sampling rates; evaluating reception characteristics at the multiple sampling rates of the received signals received by the plurality of signal receiving means on the basis of the estimated responses at the multiple sampling rates; and determining a predetermined sampling rate at which each signal receiving means samples the signal corresponding to the main information on the basis of the evaluated reception characteristics. The program includes the steps of, during a period when signals corresponding to the main information are received, controlling the sampling rates at which the received signals corresponding to the main information are sampled so as to be the predetermined sampling rates determined for every signal receiving means and controlling sampling of the received signals corresponding to the main information, received through the multiple antennas in the plurality of signal receiving means, at the predetermined sampling rates.

According to the embodiments of the present invention, the sampling rates at which the signals received by the plurality of signal receiving means are sampled are controlled so as to estimate the responses at the multiple sampling rates, the responses are estimated, and the reception characteristics are evaluated on the basis of the estimated responses. The predetermined sampling rate at which each signal receiving means samples the signal corresponding to the main information is determined on the basis of the evaluated reception characteristics, and the sampling rate at which each signal receiving means samples the signal corresponding to the main information is controlled so as to be the determined predetermined sampling rate.

A network means a mechanism over which at least two apparatus are connected and in which information can be transmitted from one apparatus to another apparatus. The apparatuses communicated with each other over the network may be separated from each other or may be internal block composing one apparatus.

The communication may be wireless communication or wired communication. Or, the wireless communication and the wired communication may be mixed in the communication, that is, the wireless communication may be performed in some sections and the wired communication may be performed in other sections. Alternatively, the wired communication may be established from one apparatus to the other apparatus and the wireless communication may be established from the other apparatus to the one apparatus.

The receiver apparatus may be an independent apparatus or may be a block performing the reception process in a transmission and reception apparatus or an information processing apparatus.

According to the present invention, it is possible to receive signals. Particularly, the sampling rate providing superior reception characteristics is selected from the multiple sampling rates for every sampling of a signal received by each signal receiving means and the sampling rate at the reception is controlled. Accordingly, it is possible to improve the reception characteristics while reducing increases in the power consumption, in the area of the circuit, and in the cost.

BRIEF DESCRIPTION OF THE DRAWINGS

FIG. 11 illustrates an example of a channel response;

FIGS. 12A and 12B illustrate frequency characteristics at a sampling rate of one sample per symbol;

DESCRIPTION OF THE PREFERRED EMBODIMENTS

Figure 1:
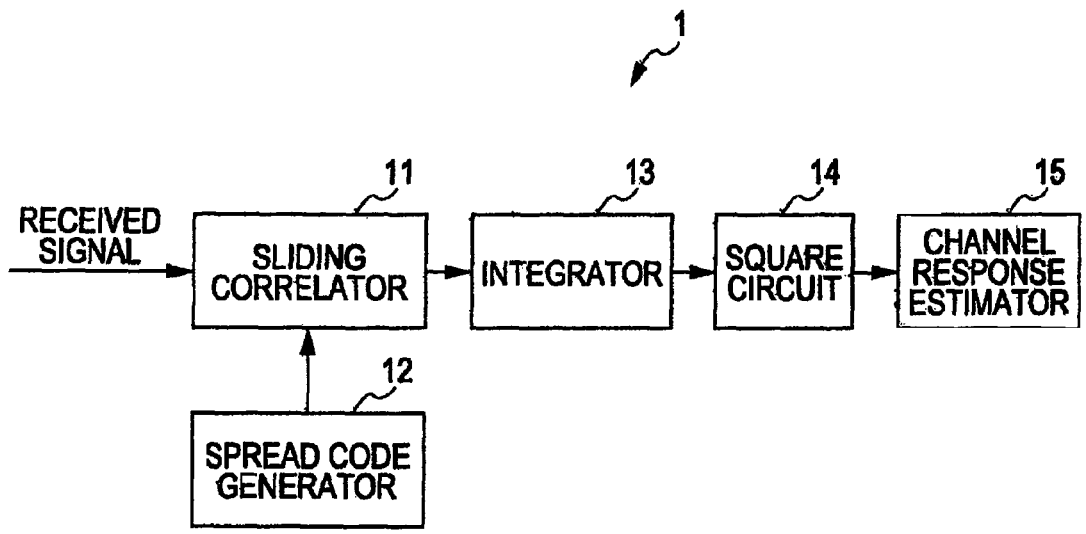
FIG. 1 is a block diagram showing an example of the configuration of a receiver apparatus in related art.
Figure 2:
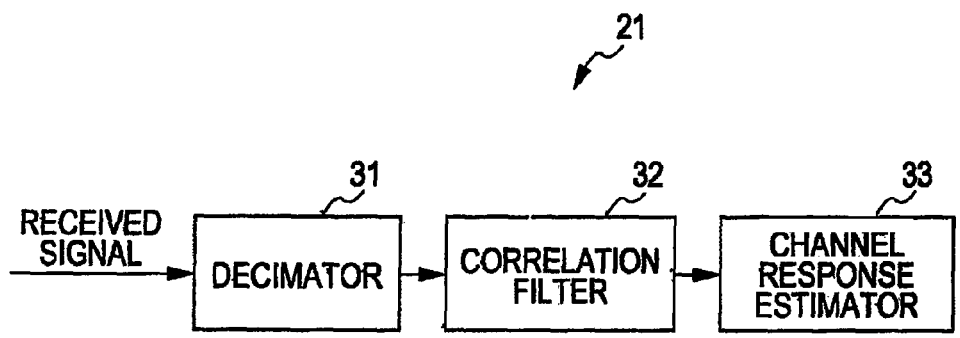
FIG. 2 is a block diagram showing an example of the configuration of another receiver apparatus in the related art.
Figure 3:
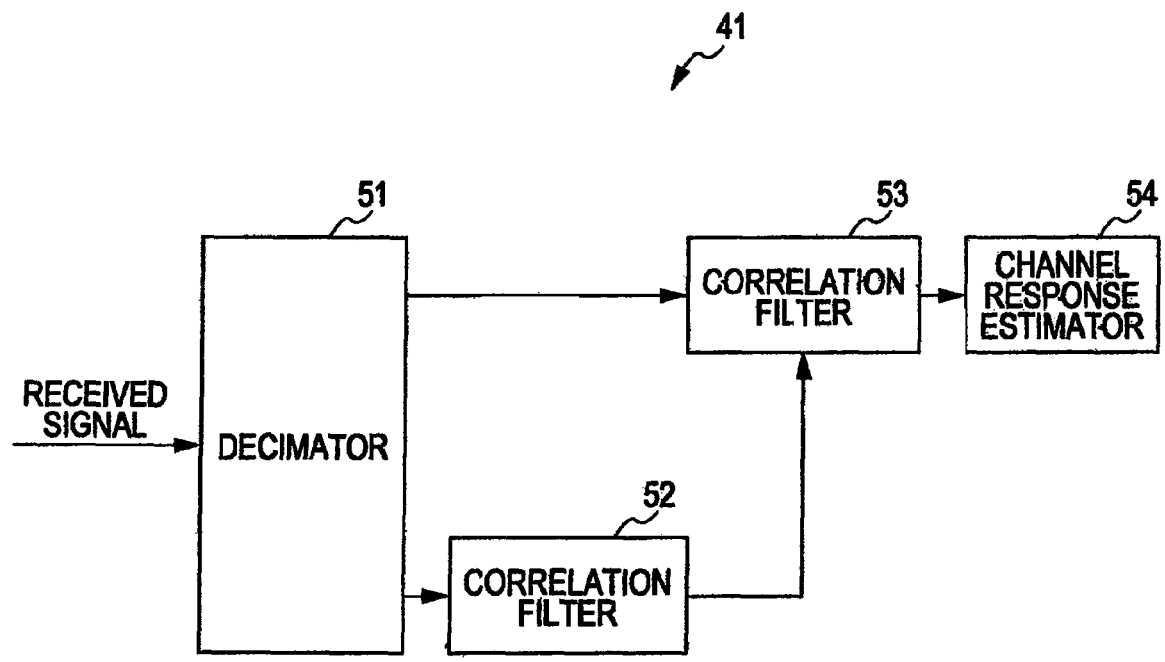
FIG. 3 is a block diagram showing an example of the configuration of another receiver apparatus in the related art.

A receiver apparatus according to an embodiment of the present invention includes, for example, multiple signal receiving units each including A/D converters each oversampling one symbol and channel filters capable of changing the degree of oversampling, a channel response estimation unit, and a signal processing unit performing signal combination and demodulation.

A signal received through the antenna of one of the multiple signal receiving units passes through, for example, a bandpass filter and an amplifier, is split by a splitter, and is supplied to the two A/D converters corresponding to an inphase (I) signal component and a quadrature (Q) signal component. The two A/D converters each oversample one symbol. The oversampled signals are supplied to the two channel filters corresponding to the I signal component and the Q signal component. The channel filters each extract an aliasing component of the received signal.

The signals that are received through the multiple antennas and that are output from the two channel filters in each signal receiving unit are used to estimate a channel response, and the demodulation is performed on the basis of the estimated channel response.

As described above, an increase in the number of the reception antennas obviously improves the reception characteristics. However, the increase in the number of the reception antennas makes a reduction in the size of the apparatus difficult and increases the cost. In addition, an increase in the sampling rate obviously improves the characteristics. However, for example, in the fractional sampling, it is necessary to increase the operation speed of the circuit in accordance with the degree of the fractional sampling, thus increasing the power consumption. When parallel signal processing is adapted, the area where the circuit is mounted is increased and the cost is also increased.

In the reception of signals through antennas of a predetermined number determined on the basis of the size or cost of the apparatus, it is desired that the reception characteristics be improved while reducing the increase in the power consumption and the cost.

Accordingly, in each signal receiving unit in the receiver apparatus described above, the sampling rate of the output from the channel filter is not fixed, that is, is variable. The sampling rates may be set to different values for different signal receiving units. The above-described receiver apparatus determines which sampling rate, among the sampling rates that can be set for the outputs from the channel filters in each signal receiving unit, provides superior reception characteristics on the basis of the channel response of each transmission antenna when multiple transmission antennas are used and on the basis of the channel response of the signal transmitted through the transmission antenna when one transmission antenna is used. The receiver apparatus sets the sampling rate providing the superior reception characteristics for each signal receiving unit to perform communication. The sampling rate may be set so as to satisfy a request for the amount of power consumption.

It is preferable that each signal receiving unit have different sampling points at the different sampling rates that can be set in order to improve the reception characteristics.

Exemplary embodiments of the present invention will herein be described with reference to the attached drawings.

Figure 4:
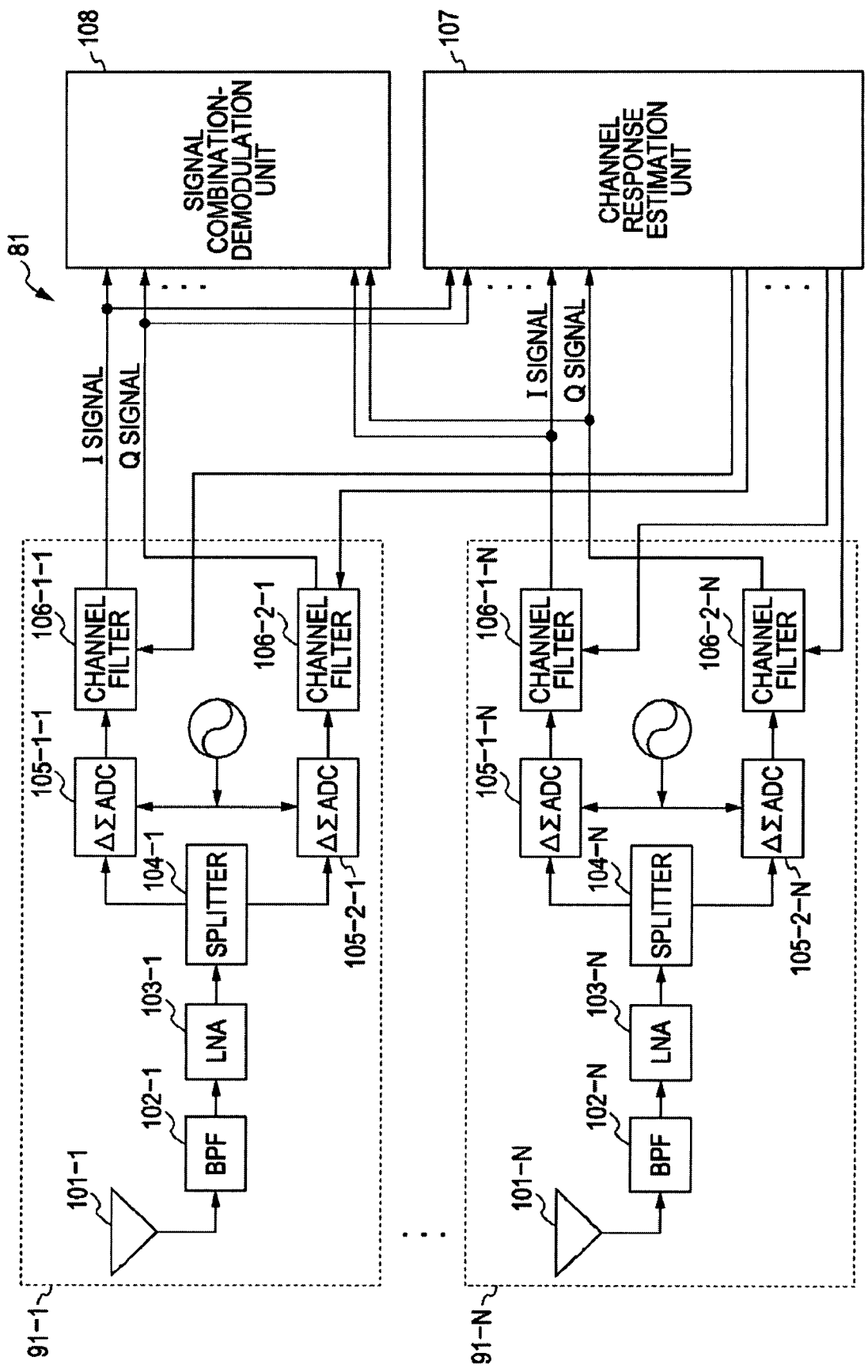
FIG. 4 is a block diagram showing an example of the configuration of a receiver apparatus according to an embodiment of the present invention.

FIG. 4 is a block diagram showing an example of the configuration of a receiver apparatus 81 including multiple receiving units capable of switching between sampling rates, according to an embodiment of the present invention.

The receiver apparatus 81 includes receiver units of N number from a receiver unit 91-1 to a receiver unit 91-N, a channel response estimation unit 107, and a signal combination-demodulation unit 108. A signal subjected signal combination and demodulation is processed in a digital signal processing unit (not shown) which is provided downstream of the above components. Since the receiver units 91-1 to 91-N basically have similar configurations, the configuration of the receiver unit 91-1 will now be described with reference to FIG. 4.

The receiver unit 91-1 includes an antenna 101-1, a bandpass filter (BPF) 102-1, a low noise amplifier (LNA) 103-1, a splitter 104-1, ΔΣ A/D converters 105-1-1 and 105-2-1, and channel filters 106-1-1 and 106-2-1.

A signal received through the antenna 101-1 is supplied to the BPF 102-1. The BPF 102-1 filters out signals outside a predetermined frequency range. The LNA 103-1 amplifies the supplied radio-frequency (RF) signal with a low noise.

The splitter 104-1 splits the amplified RF signal and supplies the split signals to the ΔΣ A/D converters 105-1-1 and 105-2-1.

The ΔΣA/D converters 105-1-1 and 105-2-1 each convert the supplied RF signal into a bit string of one bit to perform high-order oversampling. The oversampled signals are supplied to the channel filters 106-1-1 and 106-2-1.

The channel filters 106-1-1 and 106-2-1 each adjust the sampling rate before the demodulation and perform filtering to extract the aliasing component of the received signal. The channel filters 106-1-1 and 106-2-1 adjust the sampling rates (change the degree of oversampling) under the control of the channel response estimation unit 107. In the channel filters 106-1-1 and 106-2-1, multiple sampling rates that can be set may be set in advance and may be adjusted to any sampling rate under the control of the channel response estimation unit 107. Alternatively, the channel filters 106-1-1 and 106-2-1 may use any sampling rate within a predetermined range under the control of the channel response estimation unit 107. The adjustment of the sampling rate will be described in detail below.

The inphase (I) signal output from the channel filter 106-1-1 and the quadrature (Q) signal output from the channel filter 106-2-1 are supplied to the channel response estimation unit 107 and the signal combination-demodulation unit 108.

In the following description, the antennas 101-1 to 101-N are collectively referred to as the antenna 101 if it is not necessary to differentiate the individual antennas. The BPFs 102-1 to 102-N are collectively referred to as the BPF 102 if it is not necessary to differentiate the individual BPFs. The LNAs 103-1 to 103-N are collectively referred to as the LNA 103 if it is not necessary to differentiate the individual LNAs. The splitters 104-1 to 104-N are collectively referred to as the splitter 104 if it is not necessary to differentiate the individual splitters. The ΔΣ A/D converters 105-1-1, the ΔΣ A/D converter 105-2-1, . . . ,the ΔΣ A/D converter 105-1-N, and the ΔΣ A/D converter 105-2-N are collectively referred to as the ΔΣ A/D converter 105 if it is not necessary to differentiate the individual ΔΣ A/D converters. The channel filter 106-1-1, the channel filter 106-2-1, ..., the channel filter 106-1-N, and the channel filter 106-2-N are collectively referred to as the channel filter 106 if it is not necessary to differentiate the individual channel filters.

The channel response estimation unit 107 estimates a channel response from the output from the channel filter 106. The channel response estimation unit 107 changes the degree of oversampling in the channel filter 106 on the basis of the estimated channel response. In addition, the channel response estimation unit 107 supplies a control signal used for controlling, for example, diversity combination, RAKE combination, or MIMO signal demodulation to the signal combination-demodulation unit 108. The signal combination-demodulation unit 108 demodulates the oversampled signal by a predetermined method corresponding to the format of the received signal. The function of the channel response estimation unit 107 will be described in detail below with reference to FIG. 6.

Although the ΔΣ A/D converter 105 is used for the analog-to-digital conversion in the receiver apparatus 81 shown in FIG. 4, an A/D converter performing A/D conversion other than ΔΣ A/D conversion may be used. Although the oversampling is performed in the A/D conversion and the sampling rate before the demodulation is adjusted in the channel filter 106 in the receiver apparatus 81 shown in FIG. 4, the sampling rate may be adjusted in the A/D conversion. Alternatively, the sampling rate may be adjusted in the A/D conversion after frequency conversion is performed in a mixer, as in manners commonly adapted.

Specifically, although the ΔΣ A/D converters 105 is used for the A/D conversion and the channel filter 106 adjusts the sampling rate before the demodulation in the receiver apparatus 81 shown in FIG. 4, another configuration may be adapted as long as the function of receiving an analog signal and converting the analog signal into a digital signal having a sampling rate among multiple predetermined sampling rates or a sampling rate within a predetermined range under the control of the channel response estimation unit 107 is achieved.

The adjustment of the sampling rate in the channel filter 106 will now be described in detail.

In the conversion of the sampling rate of a received signal into a desired sampling rate, a method is normally used in which the sampling rate is upsampled to a clock rate realizing the least common multiple of the rates of two clocks, the signal is caused to pass through a filter for removing the aliasing component, and the sampling rate is downsampled (for example, refer to P. P. Vaidyanathan "Multirate systems and filter banks", PRENTICE-HALL PTR).

Since the clock rate realizing the least common multiple becomes higher depending on the sampling rate in such a method, the method can be impractical for the power consumption and the area of the circuit in view of the mounting of a digital filter downstream of the channel filter 106.

For example, in conversion of an input sample frequency Fs into a frequency given by multiplying the frequency Fs by 1.5, input of two sample signals requires output of three sample signals. Accordingly, it is necessary to complement the one sample signal to be output with any data. This means generation of an aliasing component for every frequency of 0.5 Fs (1.5Fs×⅓). Insertion of data at the last timing allows the characteristics of a SINC filter (adaptive partial smoothing filter) to be added to the generated aliasing component, thus attenuating the aliasing component. In addition, addition of 1.5 Fs for every two sample signals can realize the SINC filter to attenuate the aliasing component interfering in the decimation. Although the effect of the aliasing is caused if the symbol yielded in the above manner is further decimated, the decimation is acceptable as long as the aliasing component is attenuated to an allowable range by the SINC filter. If a desired signal is a narrowband signal and no aliasing component interferes in the bandwidth, the effect of the aliasing can be lessened in the downstream digital filter.

The above system is an equivalence of provision of two-stage SINC filters and the mounting cost of the system becomes very low. However, limitation of an anti-aliasing filter to the SINC filter causes problems including an insufficient amount of attenuation of the aliasing component, attenuation of an amplitude within a desired bandwidth, or the necessity for consideration of degradation of the characteristics. In order to minimize the effect of such problems, it is preferred that resampling be performed at a frequency as higher as possible and that the frequency range to be converted be set above the desired bandwidth at a minimum. In this case, no aliasing component occurs in the desired bandwidth and any aliasing component outside the desired bandwidth can be attenuated by using the downstream digital filter. In addition, since the notch frequency of the first-stage SINC filter becomes high in the above case, the amount of attenuation in the desired bandwidth is decreased.

With the above method, it is possible to reduce the mounting cost of the channel filter 106 performing the conversion of the sampling rate. However, since the speed necessary for an upstream digital filter is increased, the power consumption can be increased.

Figure 5:
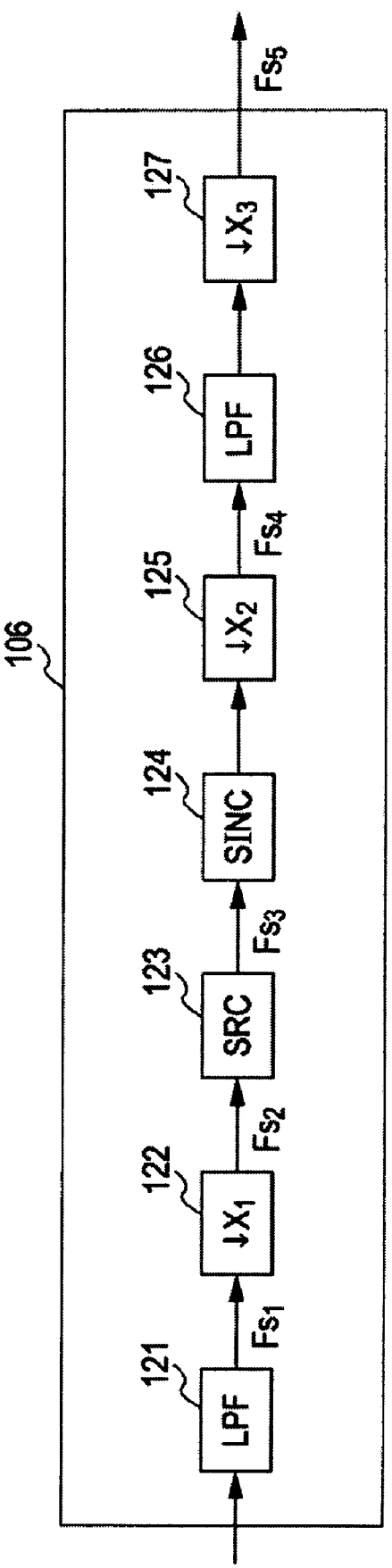
FIG. 5 is a block diagram showing an example of the configuration of a channel filter in FIG. 4.

The channel filter 106 may have a configuration shown in FIG. 5.

Referring to FIG. 5, an low-pass filter (LPF) 121 filters out high-frequency signal components having frequencies higher than a predetermined frequency range. A decimator 122 reduces the sampling rate of the input signal by a predetermined rate X1 (multiplies the sampling rate thereof by 1/X1). Since the decimator 122 picks up and outputs a signal sampled at a sampling rate Fs1 at predetermined timing, the sampling points of an output signal at a predetermined sampling rate Fs2 is determined in accordance with the time when the signal is picked up.

A sampling rate converter (SRC) 123 complements the yielded data at a rate of Fs2/(Fs3−Fs2) where "Fs2" denotes the sampling rate of the input signal and "Fs3" denotes the sampling rate of the output signal.

A SINC filter 124 performs moving averaging. The SINC filter 124 may be omitted in the channel filter 106 depending on error vector magnitude (EVM) measurements that are required. Generally, the EVM measurements required for binary phase shift keying (BPSK) or quadrature phase shift keying (QPSK) are less than −20 dB and the EVM measurements required for 16 quadrature amplitude modulation (16QAM) and 64QAM are less than −30 dB. In view of such requirements, it is sufficient to achieve the characteristics yielded when the SINC filter is omitted in the BPSK or the QPSK.

A decimator 125 reduces the sampling rate of the input signal by a predetermined rate X2 (multiplies the sampling rate thereof by 1/X2). Since the decimator 125 picks up and outputs an input signal sampled at the sampling rate Fs3 at predetermined timing, the sampling points of an output signal at a predetermined sampling rate Fs4 is determined in accordance with the time when the signal is picked up. An LPF 126 filters out high-frequency signal components having frequencies higher than a predetermined frequency range. A decimator 127 reduces the sampling rate of the input signal by a predetermined rate X3 (multiplies the sampling rate thereof by 1/X3). Since the decimator 127 picks up and outputs an input signal sampled at the sampling rate Fs4 at predetermined timing, the sampling points of an output signal at a sampling rate Fs5 necessary in the downstream system is determined in accordance with the time when the signal is picked up.

In other words, in the channel filter 106, appropriately setting the decimation rates and the sampling points in the decimator 122, the decimator 125, or the decimator 127 and appropriately setting the conversion factor of the sampling rate (the rate of occurrence of signals to be complemented) in the sampling rate converter 123 allow the output from the $\Delta\Sigma$ A/D converters 105 to be converted into a signal at a predetermined sampling point at a predetermined sampling rate to perform the filtering.

Figure 6:
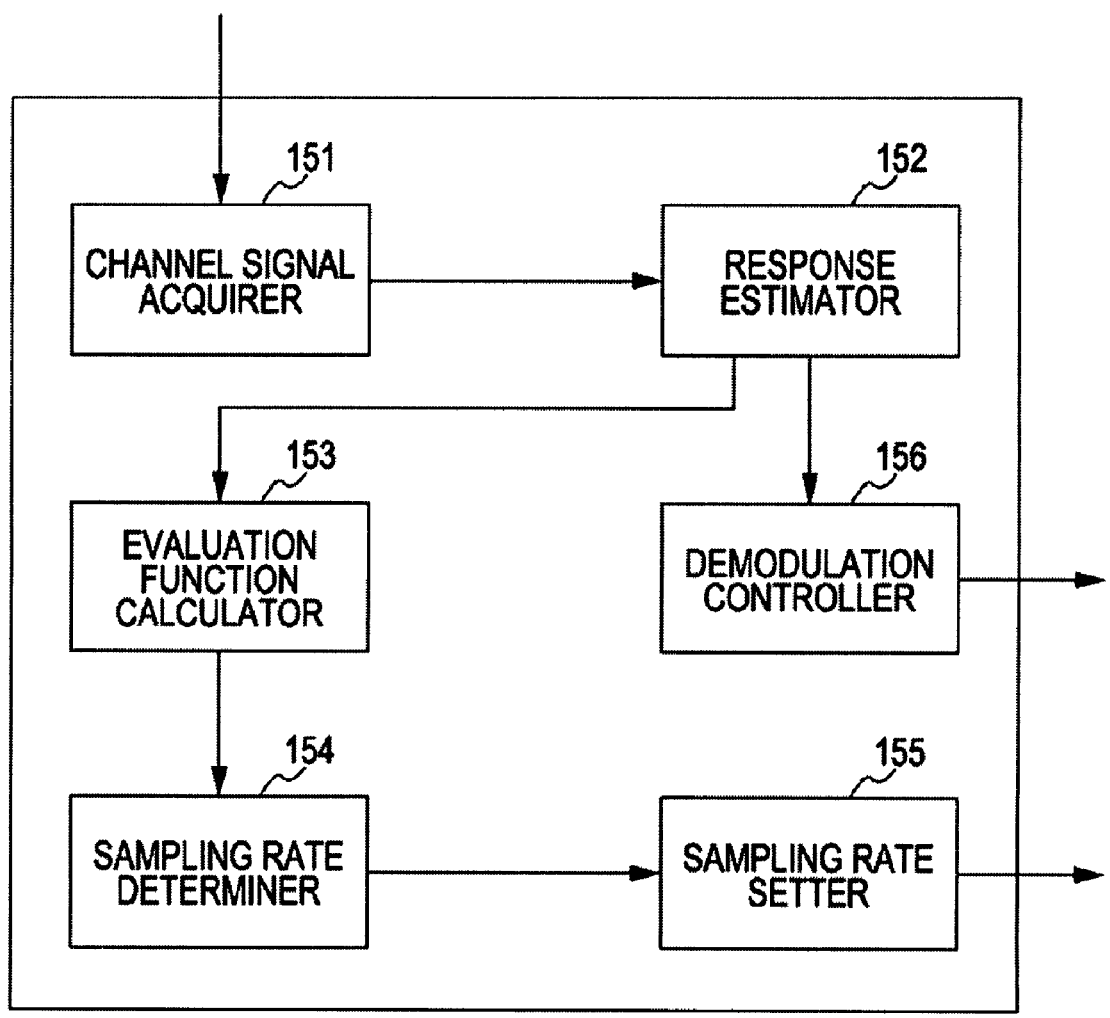
FIG. 6 is a functional block diagram showing an example of the function of a channel response estimation unit in FIG. 4.

FIG. 6 is a functional block diagram showing an example of the function of the channel response estimation unit 107. The channel response estimation unit 107 has a function represented by a channel signal acquirer 151, a response estimator 152, an evaluation function calculator 153, a sampling rate determiner 154, a sampling rate setter 155, and a demodulation controller 156.

The channel signal acquirer 151 acquires a channel signal from the channel filter 106.

The response estimator 152 estimates a response on the basis of the channel signal acquired by the channel signal acquirer 151. The estimation of a response will be described in detail below.

The evaluation function calculator 153 evaluates the reception characteristics on the basis of the reception response of a synchronization signal or spread code transmitted before valid data is transmitted and received, that is, before real data is transmitted, for example, during the period when the synchronization signal or the spread code is transmitted, in order to determine the most effective sampling rate. Specifically, the evaluation function calculator 153 calculates a predetermined evaluation function used for evaluating the reception characteristics.

The sampling rate determiner 154 controls the sampling rate setter 155 before valid data is transmitted and received, for example, during the period when the synchronization signal or the spread code is transmitted, so as to perform the receiving process in which the responses can be yielded at multiple sampling rates. The sampling rate determiner 154 determines the sampling rate (the sampling points, if necessary) at the reception of the valid data on the basis of the calculation result of the evaluation function based on the responses by the evaluation function calculator 153 and conditions for the power consumption, if necessary.

As described above, the channel filter 106 determines in advance the multiple sampling rates that can be set and the sampling points at the individual sampling rates and adjusts the sampling rates to any sampling rate under the control of the channel response estimation unit 107.

Accordingly, before the valid data is transmitted and received, the sampling rate determiner 154 controls the sampling rate setter 155 so as to perform the receiving process at all the sampling points at the multiple sampling rates that can be set in advance in the receiver units 91-1 to 91-N. At the reception of the valid data, the sampling rate determiner 154 determines the most appropriate sampling rate (the sampling points, if necessary) on the basis of the calculation result of the evaluation function by the evaluation function calculator 153 and the conditions for the power consumption, if necessary.

The sampling rate setter 155 sets the sampling rate and the sampling points in each channel filter 106 under the control of the sampling rate determiner 154.

If the transmitter apparatus has multiple antennas, that is, if the transmission and reception system adapts the MIMO, the demodulation controller 156 analyzes a pilot signal among the received signals, which is transmitted along with data and to which the symbol specific to each system is allocated, to determine the factors necessary for the signal combination or the demodulation in the signal combination-demodulation unit 108 and controls the signal combination and the demodulation. The signal combination-demodulation unit 108 performs the demodulation on the basis of the analysis result after removing the interference between the received signals and separating the signal components on which the interference is superimposed. Typical methods of separating signals include maximum likelihood decision, minimum mean square error (MMSE), and Vertical-bell laboratories layered space-time (V-BLAST).

If the transmitter apparatus has one antenna, that is, if the transmission and reception system adapts the SIMO, the demodulation controller 156 determines the factors necessary for the signal combination and the demodulation in the signal combination-demodulation unit 108 and controls the signal combination and the demodulation. The factors to be determined include the number of fingers and a tap coefficient in the RAKE combination at reception of DS/SS signals and a diversity factor at reception of OFDM signals.

The evaluation function and the determination of the degree of oversampling in the receiver units 91-1 to 91-N will now be described.

It is assumed that the degree of oversampling at the m-th antenna among the antennas 101 of N number is denoted by Km. The upper bound of the channel capacity is calculated according to Expression (1):

It is assumed that the degree of oversampling at the m-th antenna among the antennas 101 of N number is denoted by Km. The upper bound of the channel capacity is calculated according to Expression (1):

[Formula 1]

$$\langle C \rangle \leq \log_2 \det\left[I + \frac{\rho}{N}R\right] \quad (1)$$

where "<C>" denotes the average value of the channel capacity, "p" denotes the average signal-to-noise (S/N) ratio, "N" denotes the number of antennas at the transmitter side, and "I" denotes an identity matrix of K x K. "K" is represented by Equation (2):

[Formula 2]

$$K = \sum_{m=1}^{M} K_m \quad (2)$$

In Expression (1), "R" denotes a normalized cross-correlation matrix and an element R (m1, k1, m2, k2) denotes the R-th element in cross-correlation matrix R. "Q" is calculated according to Equation (3):

[Formula 3]

$$Q = \left( \sum_{m=1}^{m_1-1} K_m + k_1, \sum_{m=1}^{m_2-1} K_m + k_2 \right) \qquad (3)$$

The element R (m1, k1, m2, k2) is expressed by Equations (4) and (5):

[Formula 4]

$$r(m_1, k_1, m_2, k_2) = \sum_{n=1}^{N} \langle h(m_1, k_1, n) h(m_2, k_2, n)^* \rangle \qquad (4)$$

[Formula 5]

$$R(m_1, k_1, m_2, k_2) = \frac{r(m_1, k_1, m_2, k_2)}{\sqrt{r(m_1, k_1, m_1, k_1) r(m_2, k_2, m_2, k_2)}} \qquad (5)$$

where "h(m, k, n)" denotes the channel response of a signal that is transmitted through the n-th transmission antenna and that is sampled at the k-th sampling point of the m-th reception antenna.

Although the receiver apparatus 81 receives signals with the multiple antennas, the signal transmitting apparatus can use one antenna (can adopt the SIMO) or can use multiple antennas to transmit the multiple signals (can adapt the MIMO). Specifically, the receiver apparatus 81 performs the RAKE combination or the diversity combination if the signal transmitting apparatus uses one antenna, and performs the MIMO signal demodulation if the signal transmitting apparatus uses the multiple antennas to transmit the multiple signals.

If the signal transmitting apparatus uses one antenna and the RAKE combination or the diversity combination is performed, the channel response estimation unit 107 sets both the number N of antennas in the signal transmitting apparatus and a factor N indicating where is the transmission antenna in the antennas to one to estimate the channel response.

As described above with reference to Expression (1) and Equations (2) to (5), the receiver apparatus 81 uses the multiple antennas to receive signals and the received signals can be transmitted through multiple antennas. Accordingly, instead of determining the sampling rate on the basis of the response in each receiver unit 91, the sampling rate is determined on the basis of the responses in combinations of the sampling rates in the receiver units 91-1 to 91-N according to Expression (1), for example, by using the right side of Expression (1) or Expression (6) as the evaluation function.

[Formula 6]

$$\det\left[I + \frac{\rho}{N} R\right] \qquad (6)$$

The estimation of the response when the DS/SS signals are received and when the OFDM signals are received will be described as specific examples of the estimation of the response in each receiver unit 91.

First, how to estimate the response when the receiver apparatus 81 receives the DS/SS signals will now be described.

According to IEEE802.11b, the same spread code is transmitted 128 times as synchronization symbols at the heads of the packets. The receiver apparatus 81 selects the sampling rate during the period when the symbols are received.

It is assumed that, for example, the sampling rate at the reception of data in the channel filter 106 is four samples per symbol or two samples per symbol.

The estimation of a channel impulse response at the reception of the synchronization symbols when the DS/SS signals are received (the estimation of a response in the response estimator 152 shown in FIG. 6) will now be described with reference to FIG. 7.

Figure 7:
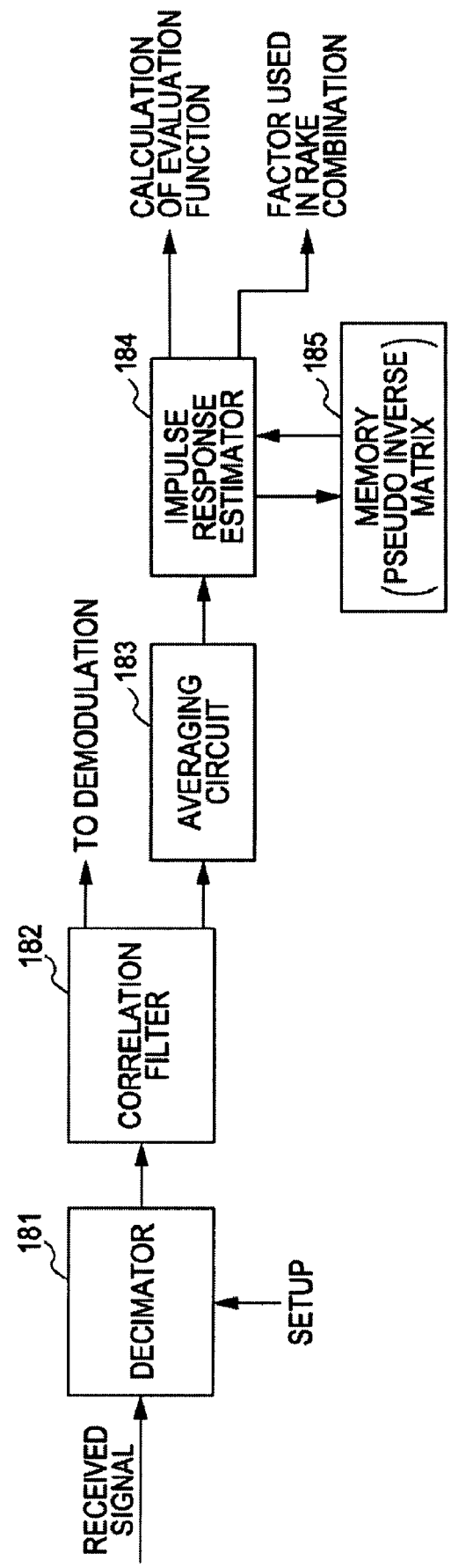
FIG. 7 illustrates estimation of an response.

Referring to FIG. 7, a decimator 181 in the channel filter 106 (for example, the decimator 122, the decimator 125, or the decimator 127 in FIG. 5) is provided to perform the sampling at the synchronization points (sampling points) at a predetermined sampling rate.

The sampling rate setter 155 in FIG. 6 sets the channel filter 106 so as to perform the sampling at the sampling points at available sampling rates. For example, provided that the sampling rate at the reception of data in the channel filter 106 is four samples per symbol or two samples per symbol, it is preferred that the sampling rate setter 155 set the channel filter 106 so as to perform the sampling at the sampling rate of four samples per symbol if the sampling points at the sampling rate of four samples per symbol include the sampling points at the sampling rate of two samples per symbol and that the sampling rate setter 155 set the channel filter 106 so as to perform the sampling at the individual sampling points, that is, at the sampling rate of six samples per symbol if the sampling points at the sampling rate of four samples per symbol differ from the sampling points at the sampling rate of two samples per symbol.

The autocorrelation function of the spread code in a correlation filter 182 is defined according to Equation (7):

[Formula 7]

$$r(d) = \sum_{m=0}^{MG-1} p(m) p(m+d) \qquad (7)$$

where "M" denotes the length of the spread code, "G" denotes the number of samples in one chip (the degree of oversampling), "p(m)" denotes the m-th sample in the waveform of the spread code, and "d" denotes the difference in phase of the autocorrelation function.

The cross-correlation matrix R is represented by Equation (8) and "r" in Equation (8) is represented by Equation (9):

[Equation 8]

$$R = r \cdot r^H \qquad (8)$$

[Equation 9]

$$r = [r(0), r(1), \ldots r(D-1)]^T \qquad (9)$$

where "D" denotes the number of samples corresponding to the maximum delay of the impulse response, "T" denotes transposition, and "H" denotes complex conjugate transposition.

The output from an averaging circuit 183 is represented by Equation (10):

[Equation 10]

$$x = [x(0), x(1), \ldots, x(D-1)]^T \qquad (10)$$

where "x(d)" denotes the output from the averaging circuit 183, corresponding to the sample of the d-th spread code.

The impulse response matrix of the channel is represented by Equation (11):

[Equation 11]

$$c = [c(0), c(1), \ldots, c(D-1)] \quad (11)$$

where "c(d)" denotes the impulse response corresponding to the delay of the d-th sample.

A memory 185 stores a pseudo inverse matrix $R^+$ of the cross-correlation matrix R. An impulse response estimator 184 uses the pseudo inverse matrix $R^+$ of the cross-correlation matrix R stored in the memory 185 to estimate the impulse response of the channel according to Equation (12):

[Equation 12]

$$c = R^+ x \quad (12)$$

At this time, singular value decomposition of the cross-correlation matrix R is performed. If Equation (13) is satisfied, Equation (14) is established by using the singular values $\sigma 1, \ldots, \sigma q$ of the cross-correlation matrix R:

[Equation 13]

$$R = U \Sigma V^T \quad (13)$$

[Equation 14]

$$\Sigma = \text{diag}(\sigma_1, \sigma_2, \ldots, \sigma_q, 0, \ldots, 0) \quad q = \text{rank}(R) \quad (14)$$

The singular values of the pseudo inverse matrix $R^+$ are given by $1/\sigma 1, \ldots, 1/\sigma q$ and the singular value decomposition of the pseudo inverse matrix $R^+$ gives Equations (15) and (16):

[Formula 15]

$$R^+ = U^+ \sum{}^+ V^{+T} \quad (15)$$

[Formula 16]

$$\sum{}^+ = \text{diag}\left(\frac{1}{\sigma_1}, \frac{1}{\sigma_2}, \ldots, \frac{1}{\sigma_q}, 0, \ldots, 0\right) \quad (16)$$
$$q = \text{rank}(R^+)$$

The use of the singular values that are too small in the calculation of the pseudo inverse matrix $R^+$ makes an large error. Accordingly, a threshold value of the singular values may be set, and the pseudo inverse matrix $R^+$ may be calculated with the singular values smaller than the threshold value being set to zero.

The response of the n-th chip in the g-th sample when one chip is oversampled by G times is given by Equation (17):

[Equation 17]

$$h_{gG}[n] = h(nT_c + gT_s/G) \quad (17)$$

where "Tc" denotes the time length of one chip.

Figure 8:
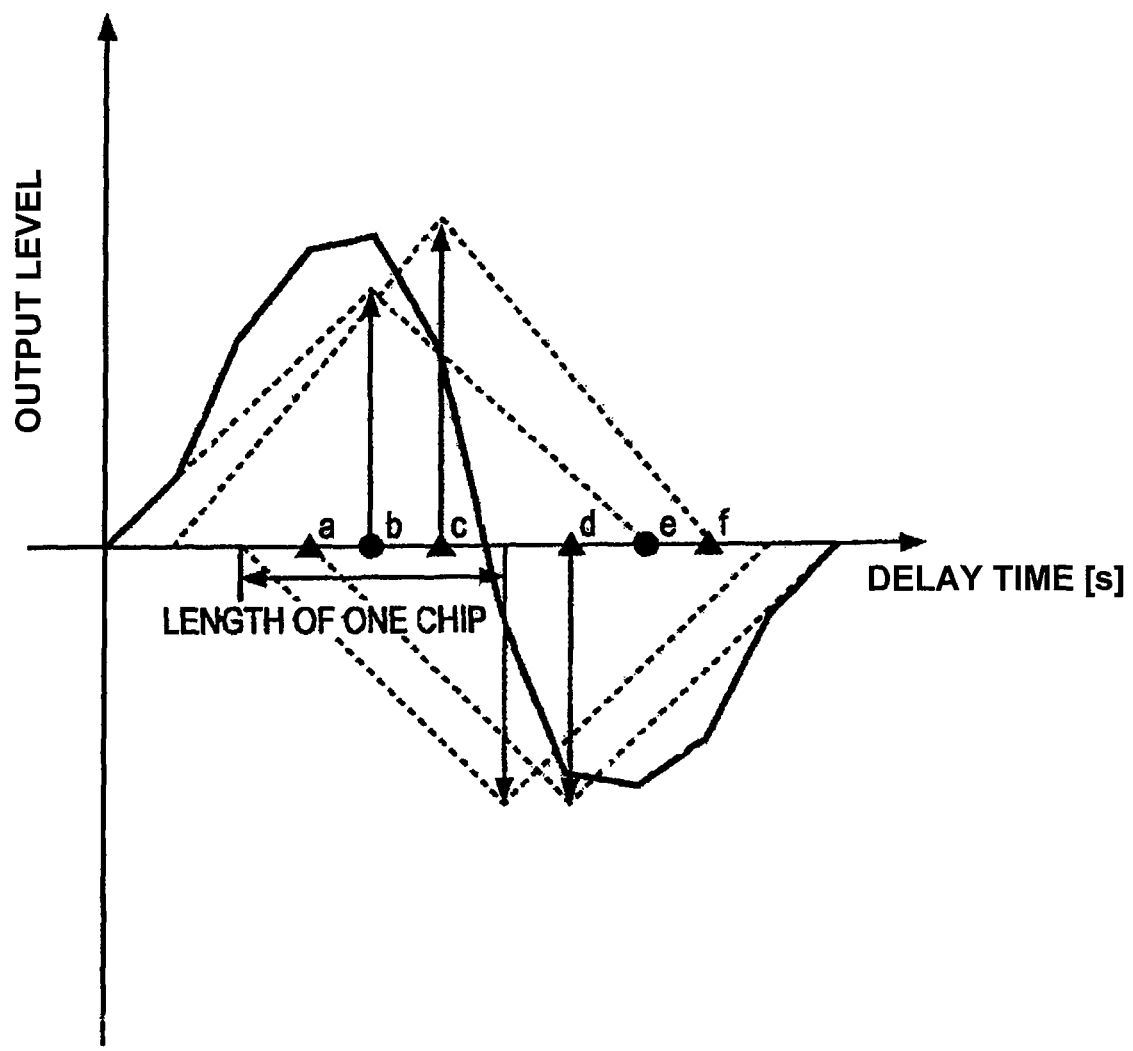
FIG. 8 is a graph illustrating an output from a correlation filter when an impulse response of four pulses exists.

FIG. 8 is a graph illustrating an output from the correlation filter 182 when the impulse response of four pulses exists. Provided that one symbol corresponds to Y chips, the channel filter 106 performs the sampling at sampling points b and e if Y samples are sampled per symbol, that is, if one sample is sampled per chip and performs the sampling at sampling points a, c, d, and f if 2×Y samples are sampled per symbol, that is, if two samples are sampled per chip.

The sampling is performed at one point on the basis of the maximum output in one symbol to perform the RAKE combination in the methods in related art. In contrast, the sampling rate setter 155 controls the channel filter 106 so as to perform the sampling at the sampling points b an e if one sample is sampled per chip and so as to perform the sampling at the sampling points a, c, d, and f if four samples are sampled per symbol, that is, if two samples are sampled per chip.

Figure 9:
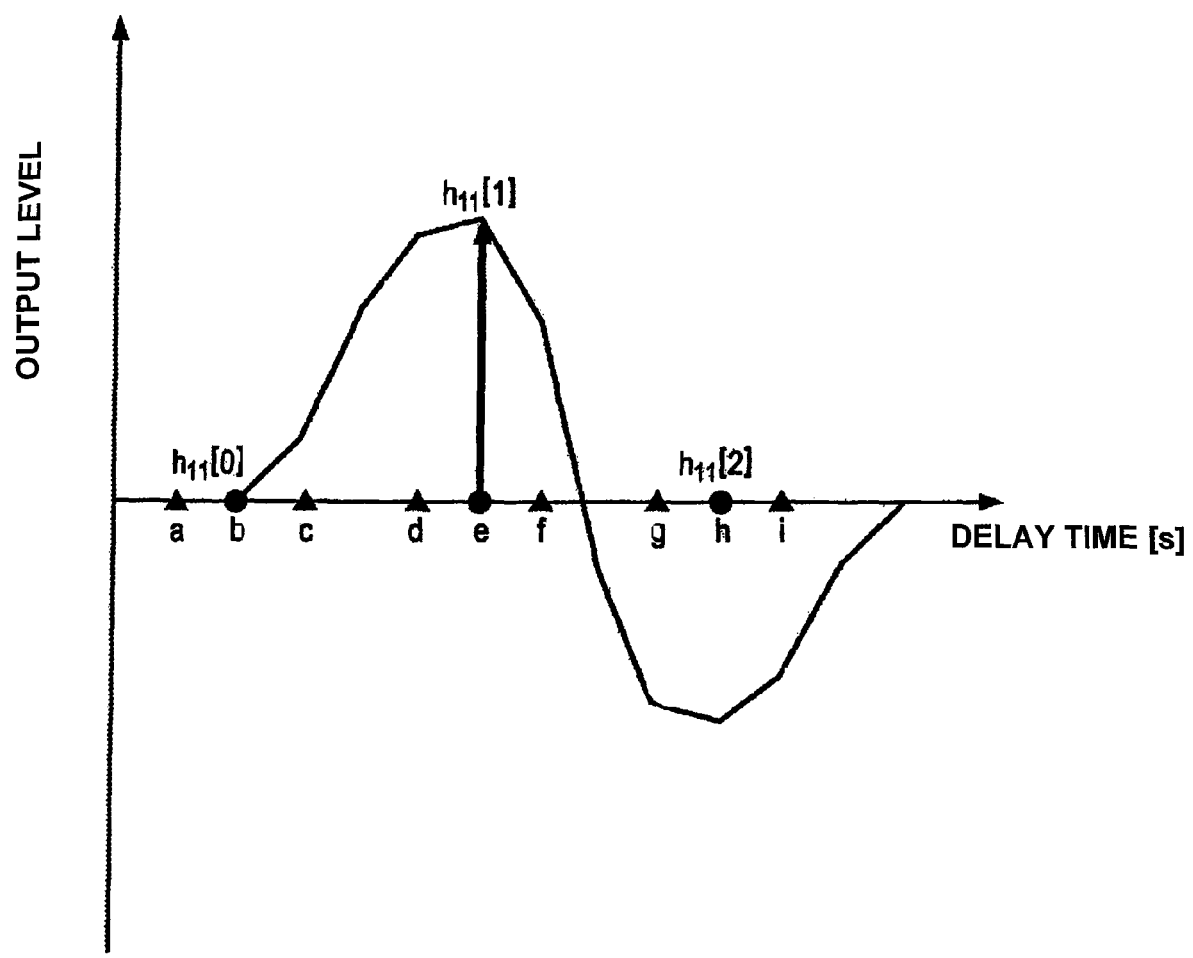
FIG. 9 is a graph illustrating examples of sampling points at a sampling rate of one sample per chip.
Figure 10:
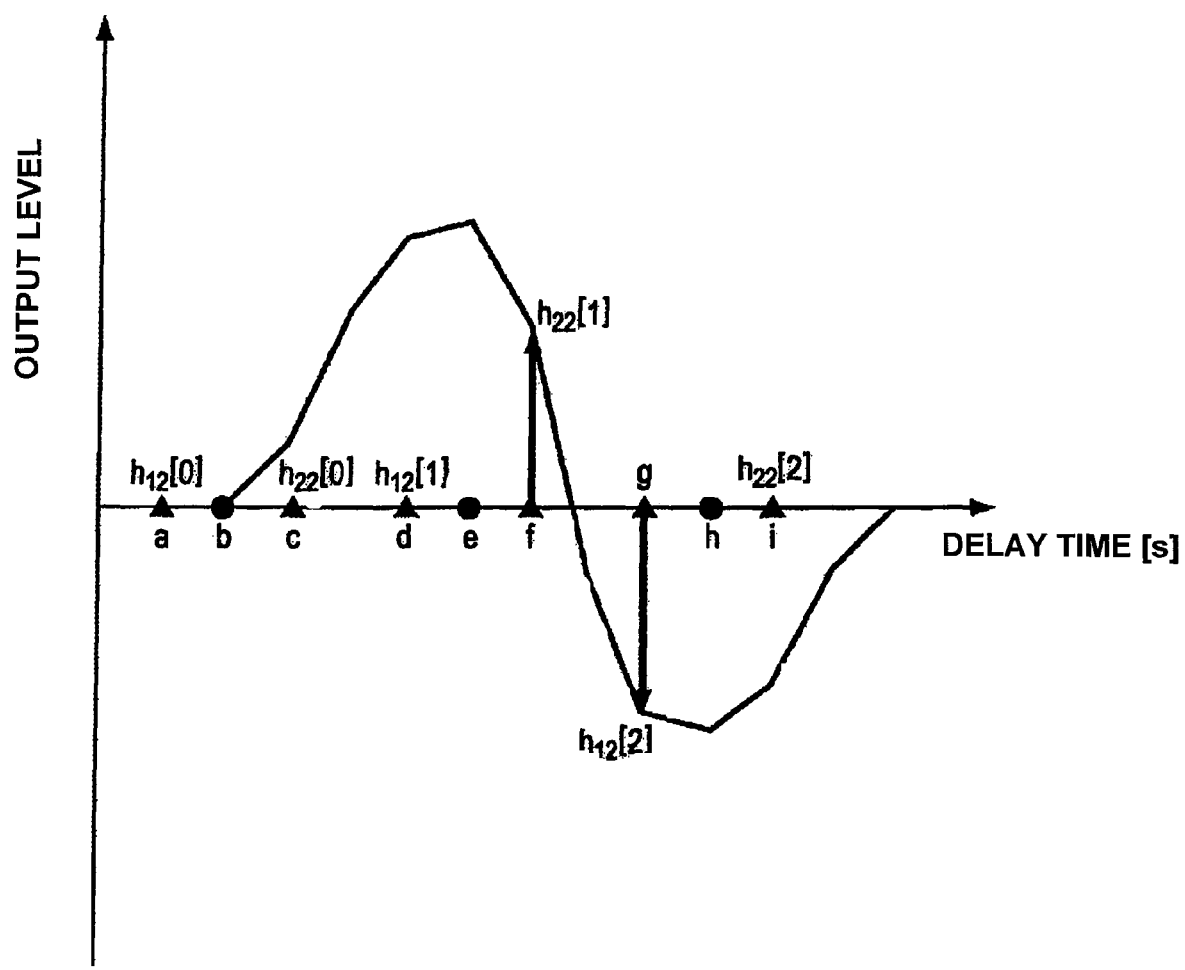
FIG. 10 is a graph illustrating examples of sampling points at a sampling rate of two samples per chip.

For example, if one sample is sampled per chip, as shown in a graph in FIG. 9, the sampling is performed at sampling points b, e, and h to perform the RAKE combination. If two samples are sampled per chip, as shown in a graph in FIG. 10, the sampling is performed at sampling points a, c, d, f, g, and i to perform the RAKE combination. Accordingly, compared with the sampling at one point indicated by b on the basis of the maximum output in the related art, it is possible to use higher signal power for the demodulation.

When the DS/SS signals are received, the response at the sampling rate of two samples per chip and the response at the sampling rate of one sample per chip are calculated in the above manner.

Next, how to estimate the response when the receiver apparatus 81 receives the OFDM signals will now be described.

Figure 13A:
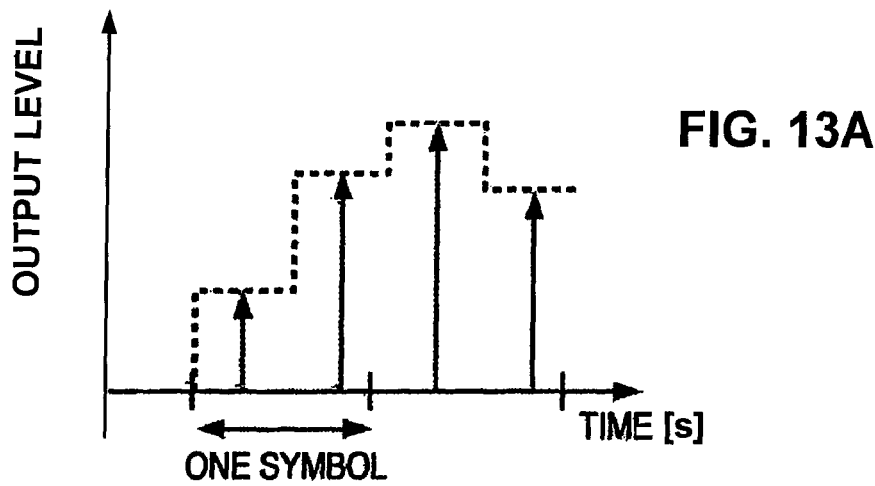
FIGS. 13A to 13C illustrate frequency characteristics at a sampling rate of two samples per symbol.
Figure 13B:
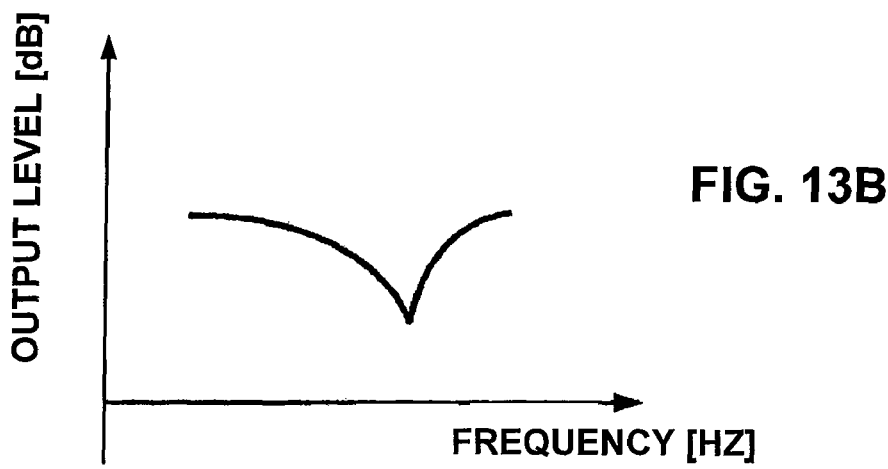
Figure 13C:
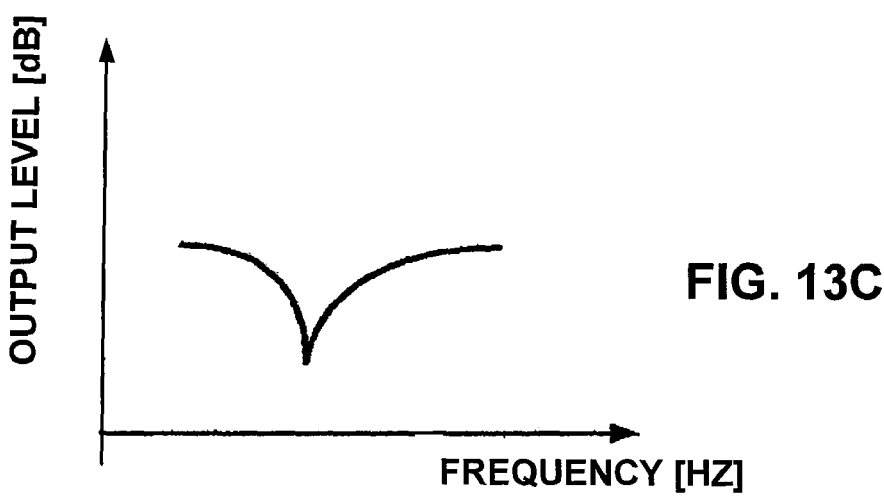

It is effective to adaptively vary the sampling rate also when important signals, such as pilot signals in the OFDM modulation, are received at certain frequencies. For example, a channel response shown in FIG. 11 is assumed. Reception of a signal through such a channel at a sampling rate of one sample per symbol, as shown in FIG. 12A, exhibits frequency characteristics shown in FIG. 12B. In contrast, if a signal is received at a sampling rate of two samples per symbol, as shown in FIG. 13A, the signal strength drops at different frequencies, as shown in FIGS. 13B and 13C. The degree of the drop in the signal strength may become small in some cases.

According to IEEE802.11a/g, the synchronization symbol is transmitted ten times at the heads of the packets. The sampling rate determiner 154 in the channel response estimation unit 107 selects the sampling rate during the period when the synchronization symbols are received ten times.

It is assumed that, for example, the sampling rate at the reception of data in the channel filter 106 is two samples per symbol or one sample per symbol.

The sampling rate setter 155 in FIG. 6 sets the channel filter 106 so as to perform the sampling at the sampling points at available sampling rates. For example, provided that the sampling rate at the reception of data in the channel filter 106 is two samples per symbol or one sample per symbol, it is preferred that the sampling rate setter 155 set the channel filter 106 so as to perform the sampling at the sampling rate of two samples per symbol if the sampling points at the sampling rate of two samples per symbol include the sampling points at the sampling rate of one sample per symbol and that the sampling rate setter 155 set the channel filter 106 so as to perform the sampling at the individual sampling points, that is, at the sampling rate of three samples per symbol if the sampling points at the sampling rate of two samples per symbol differ from the sampling points at the sampling rate of one sample per symbol.

The response estimator 152 estimates a channel impulse response by the using pseudo inverse matrix, in the same manner as in the reception of the DS/SS signals. However, the time waveform of a short preamble signal, instead of the spread code, is used as the pseudo inverse matrix in the reception of the OFDM signals. The response estimator 152 performs discrete Fourier transform (DFT) to an estimated value of the impulse response to calculate the frequency response.

Provided that the channel response is denoted by "h(t)", the n-th response of the g-th sample when one time symbol is oversampled by G times is represented by Equation (18):

[Equation 18]

$$h_{gG}[n] = h(nT_s + gT_sG) \quad (18)$$

where "Ts" denotes the length of a symbol per unit time (the length of one OFDM symbol/the number of DFT points). The frequency response of the g-th sample is represented by Equation (19):

[Formula 19]

$$H_{gG}[k] = \sum_{n=0}^{N-1} h_{gG}[n] \exp\left(-j\frac{2\pi kn}{N}\right) \quad (19)$$

where "N" denotes the number of subcarriers of the OFDM signal.

Figure 14:
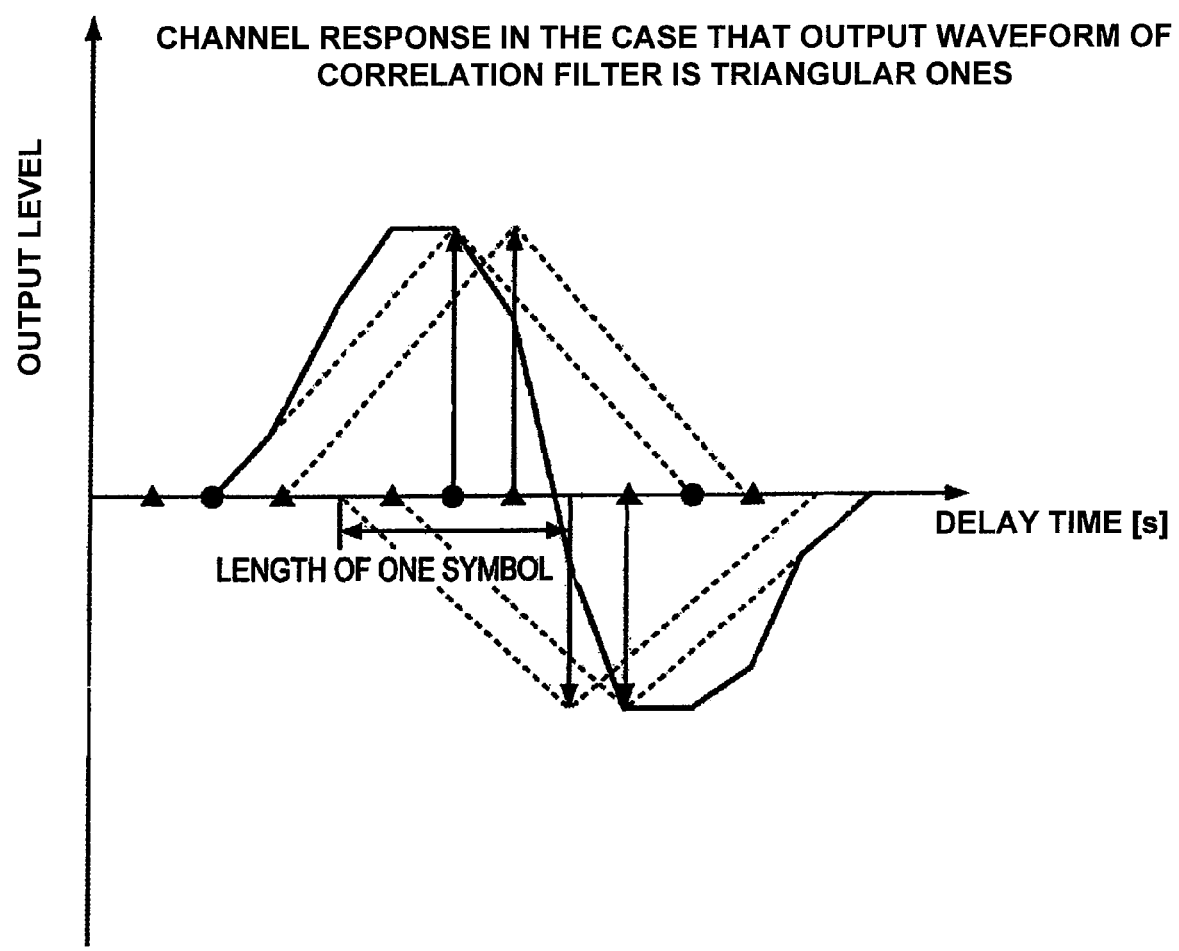
FIG. 14 is a graph illustrating an example of a channel response when received signal pulses have a triangle correlation waveform.
Figure 15:
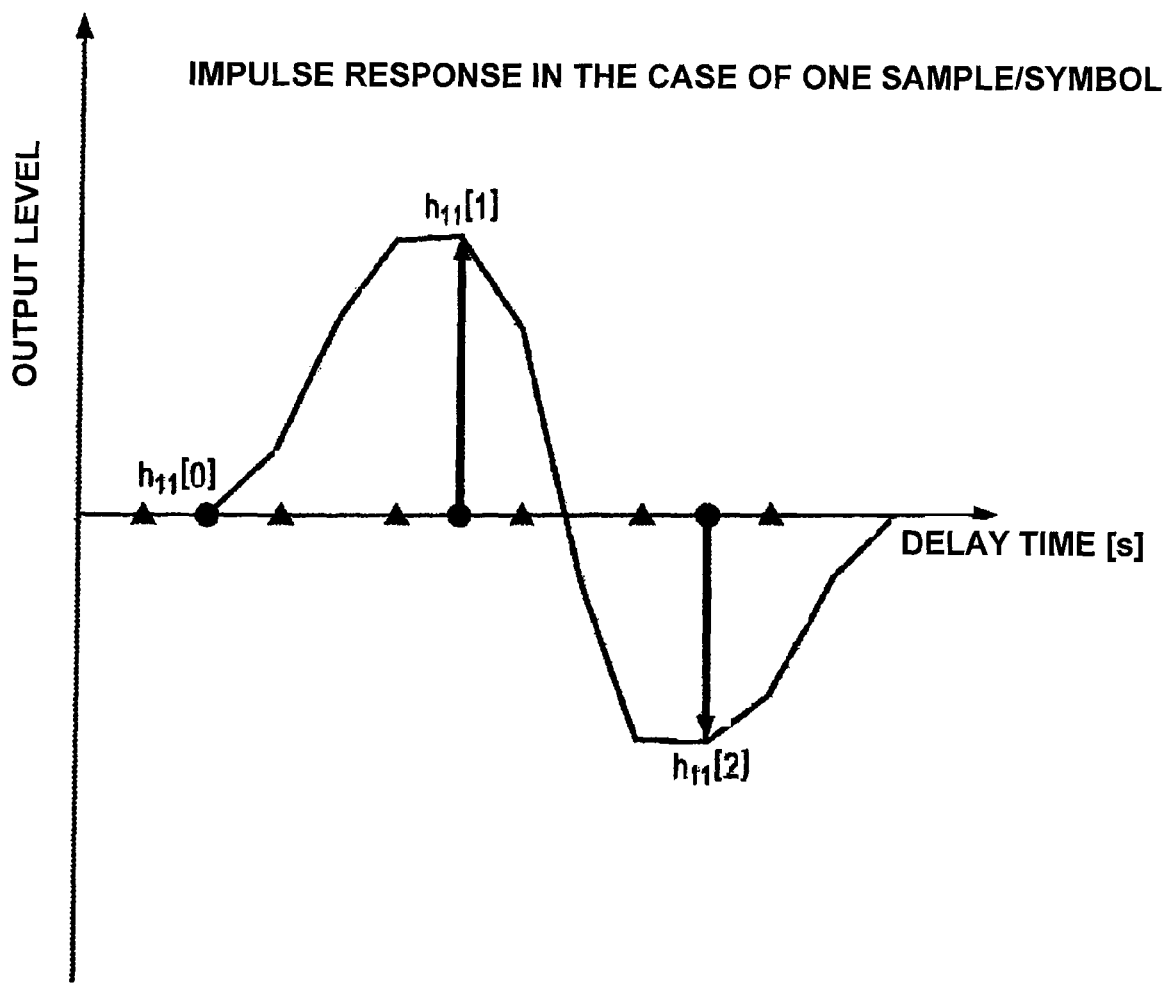
FIG. 15 is a graph illustrating a channel impulse response at the sampling rate of one sample per symbol in the example in FIG. 14.
Figure 16:
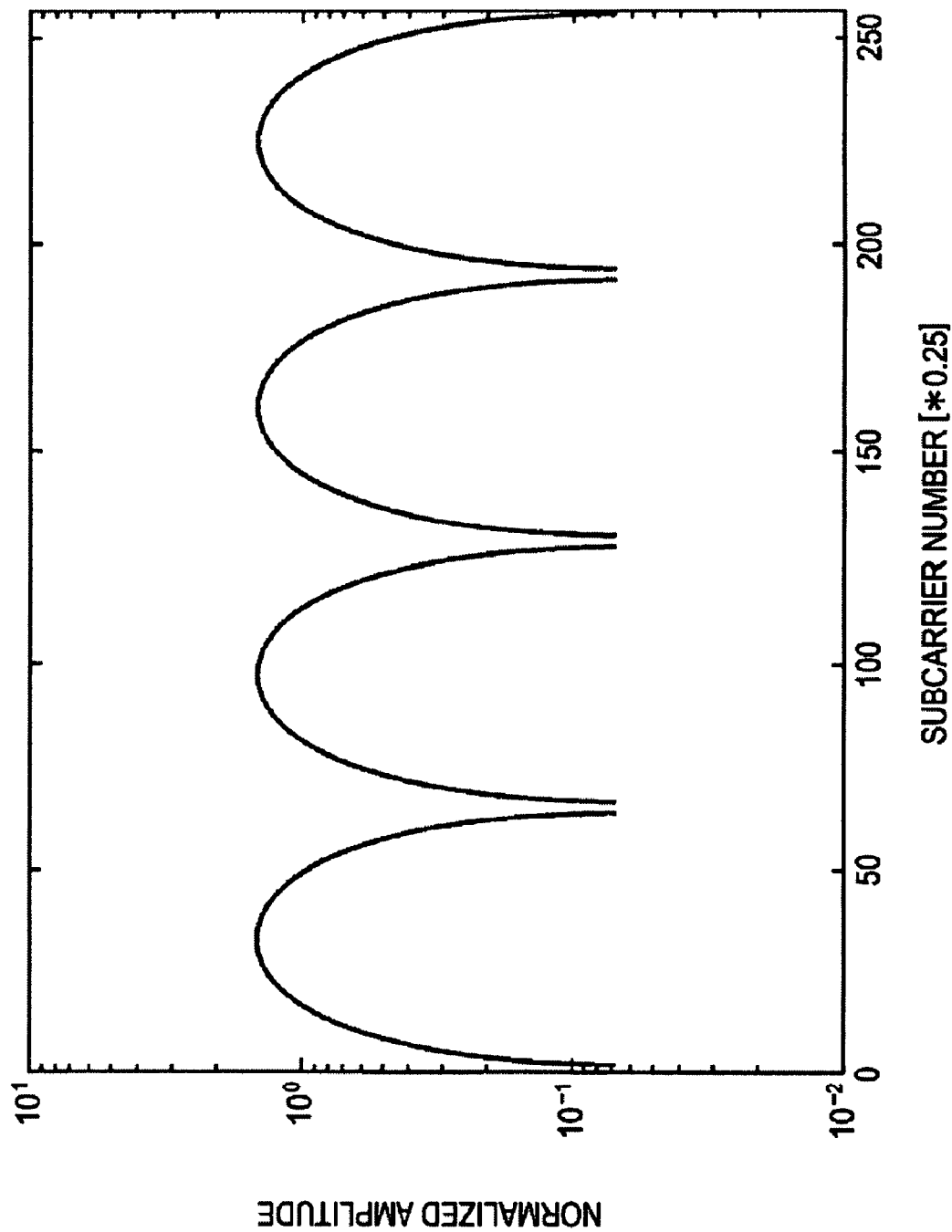
FIG. 16 is a graph illustrating a frequency response in the example shown in FIG. 15.
Figure 17:
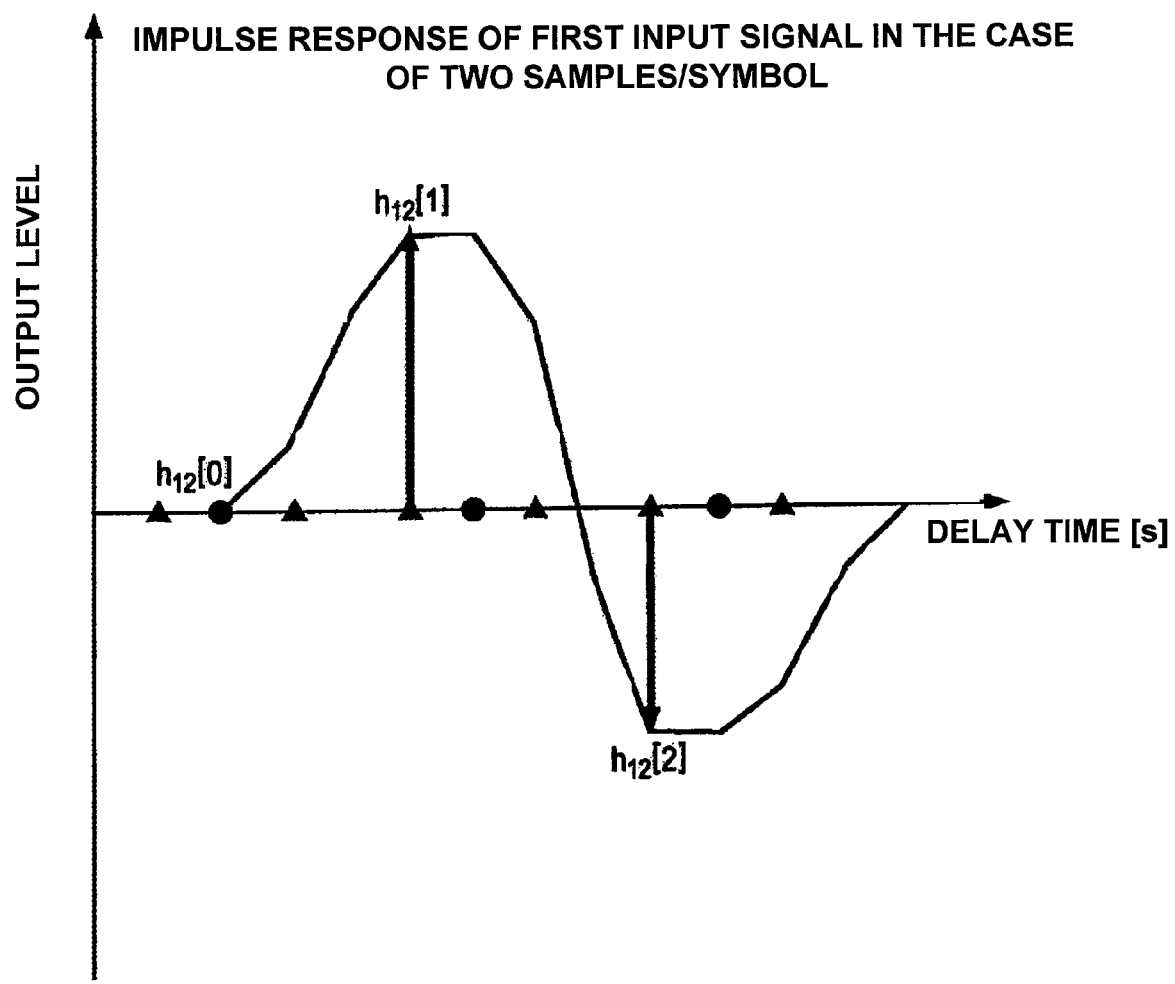
FIG. 17 is a graph illustrating a channel impulse response of the first sample at the sampling rate of two samples per symbol in the example in FIG. 14.
Figure 18:
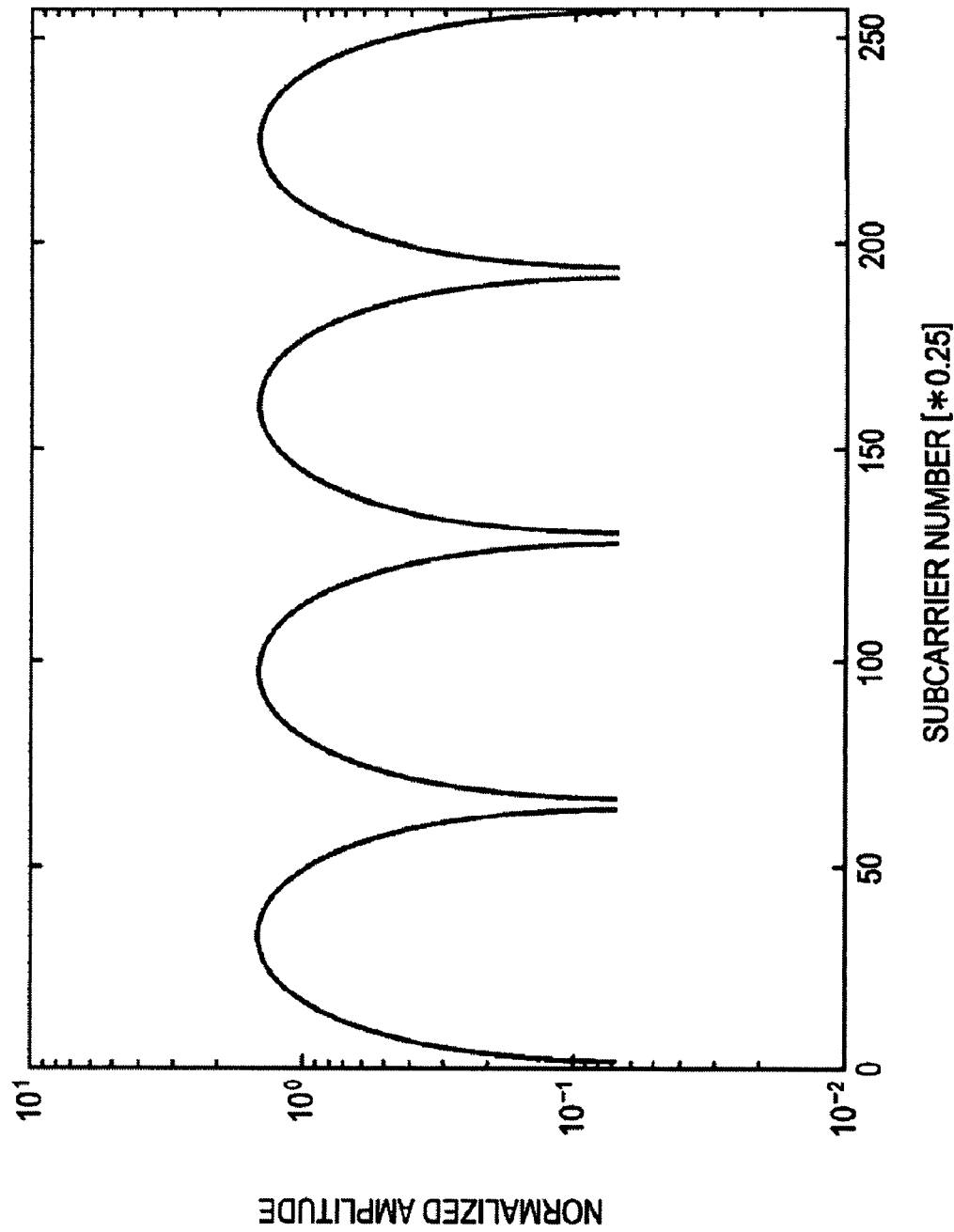
FIG. 18 is a graph illustrating a frequency response in the example shown in FIG. 17.
Figure 19:
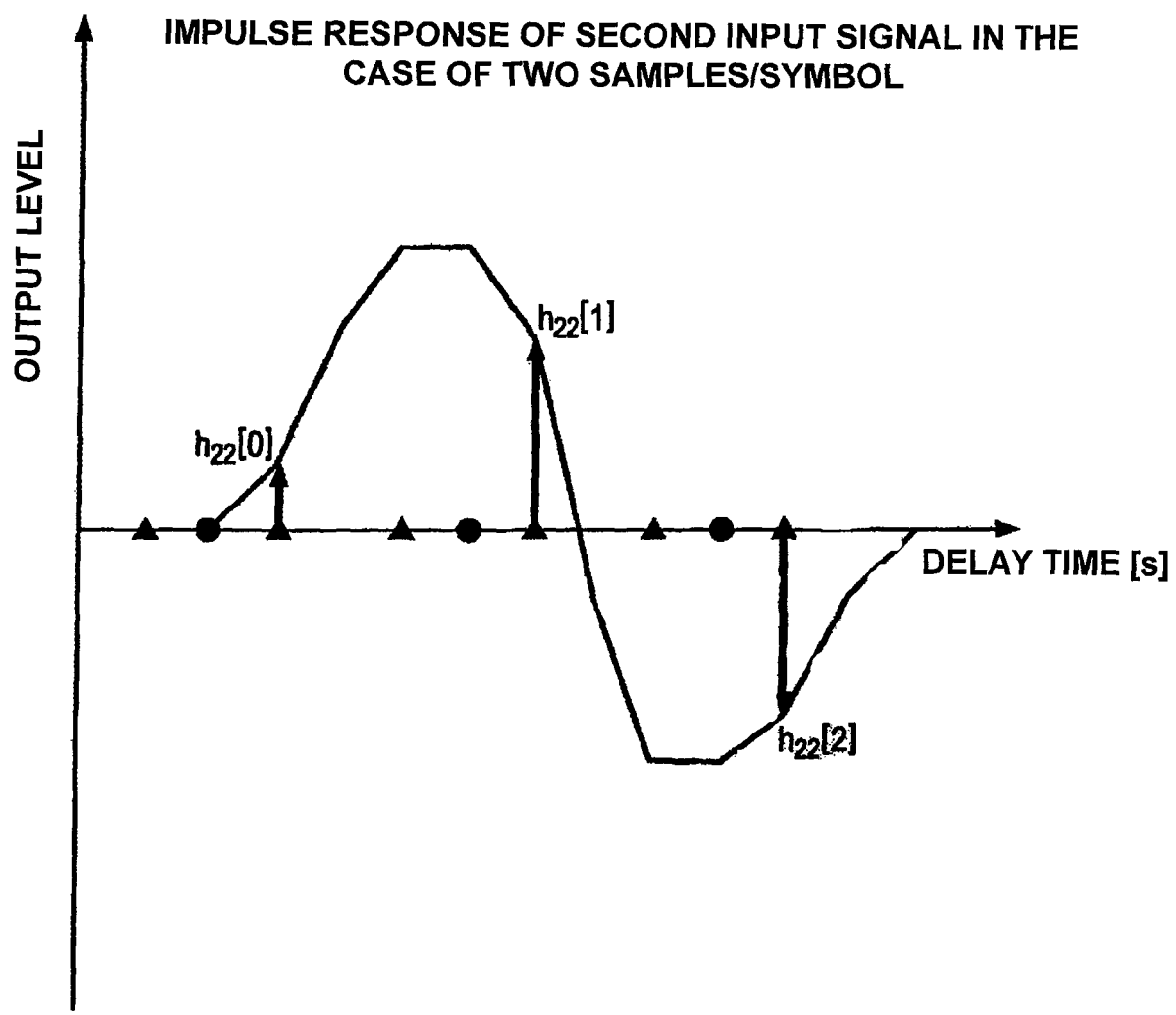
FIG. 19 is a graph illustrating a channel impulse response of the second sample at the sampling rate of two samples per symbol in the example in FIG. 14.
Figure 20:
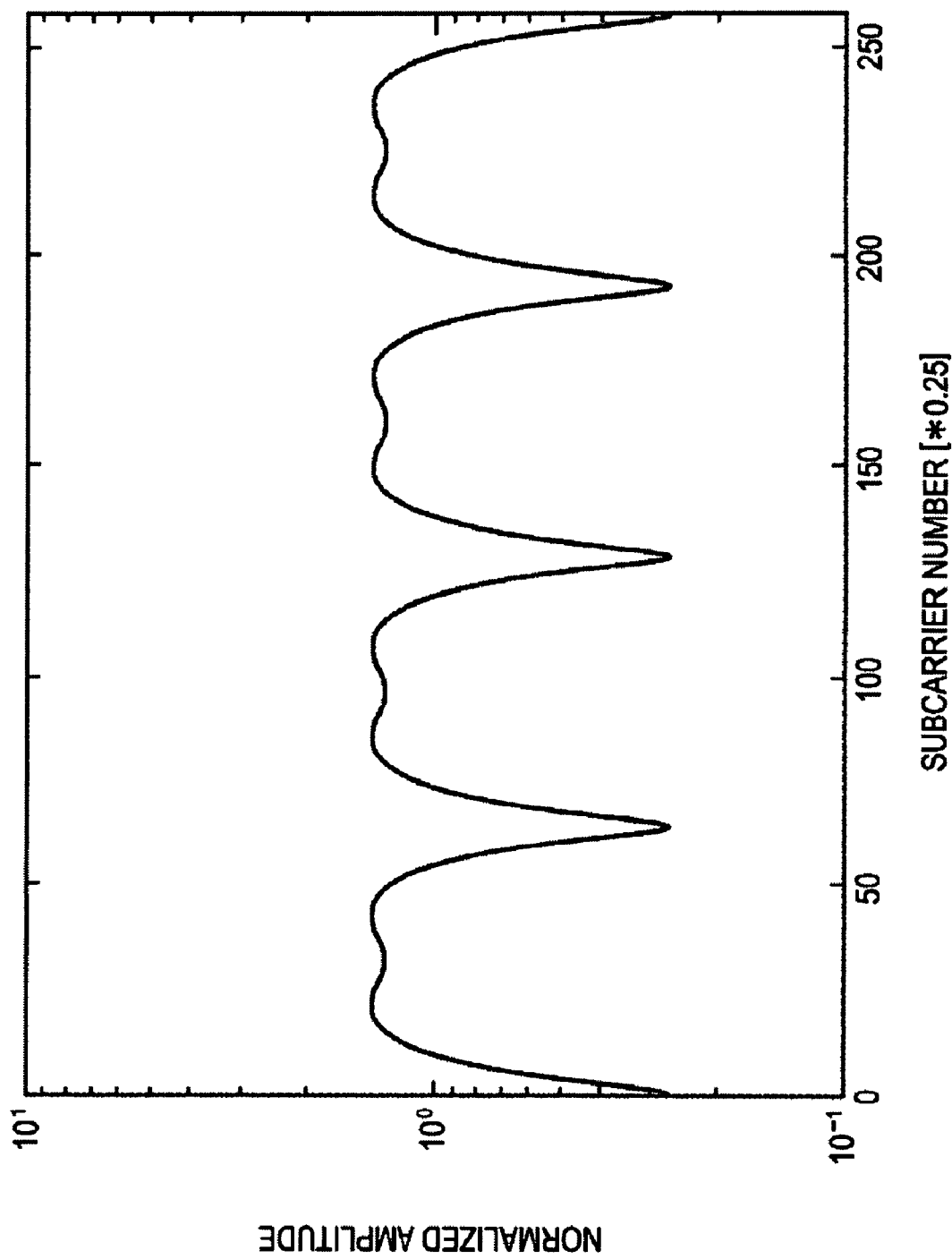
FIG. 20 is a graph illustrating a frequency response in the example shown in FIG. 19.

FIG. 14 is a graph illustrating a channel response when received signal pulses have a triangle correlation waveform. FIG. 15 is a graph illustrating a channel impulse response at the sampling rate of one sample per symbol in the example in FIG. 14. FIG. 16 is a graph illustrating a frequency response in the example shown in FIG. 15. FIG. 17 is a graph illustrating a channel impulse response of the first sample at the sampling rate of two samples per symbol in the example in FIG. 14. FIG. 18 is a graph illustrating a frequency response in the example shown in FIG. 17. FIG. 19 is a graph illustrating a channel impulse response of the second sample at the sampling rate of two samples per symbol in the example in FIG. 14. FIG. 20 is a graph illustrating a frequency response in the example shown in FIG. 19. At the sampling rate of two samples per symbol, the frequency responses shown in FIGS. 18 and 20 are subjected to the diversity combination to demodulate the signal.

For example, if a certain subcarrier (for example, a certain pilot signal) corresponds to null of the frequency response in the channel response in FIG. 14, the sampling rate may be switched to the sampling rate of two samples per symbol to perform the diversity combination.

The evaluation function calculator 153 acquires the response of a signal received through each antenna and calculates the evaluation functions in all the combinations of the degrees of oversampling in the receiver units 91-1 to 91-N according to Expression (1).

Specifically, the evaluation function calculator 153 calculates the evaluation functions according to the right side of Expression (1) or Expression (6) in all the combinations of the degrees of oversampling in the receiver units 91-1 to 91-N, on the basis of the response of the n-th chip of the g-th sample when one chip is oversampled by G times, given by Equation (17), at reception of DS/SS signals and on the basis of the response given by Equation (18) or (19) at reception of OFDM signals. The evaluation function calculator 153 supplies the calculation results to the sampling rate determiner 154.

The sampling rate determiner 154 determines the sampling rate in each of the receiver units 91-1 to 91-N on the basis of the calculation results of the evaluation functions supplied from the evaluation function calculator 153.

For example, when the evaluation function is calculated according to Expression (6), the sampling rate determiner 154 determines whether combinations satisfying Expression (20) exist among the combinations of the degrees of oversampling in the receiver units 91-1 to 91-N. In other words, the sampling rate determiner 154 determines whether combinations exist in which the evaluation function is larger than a predetermined threshold value S. If combinations exist in which the evaluation function is larger than the predetermined threshold value S, the sampling rate determiner 154 determines any of the combinations to be the combination of the sampling rates in the receiver units 91-1 to 91-N.

[Formula 20]

$$S \leq \det\left[I + \frac{\rho}{N}R\right] \quad (20)$$

For example, in a situation in which the communication quality is most important, the sampling rate determiner 154 may detect a combination of the sampling rates in which the evaluation function has the highest value and may determine the detected combination to be the combination of the sampling rates in the receiver units 91-1 to 91-N.

In a situation in which the amount of power consumption is more important than the communication quality (for example, depending on conditions including the capacity of the battery in an apparatus and the remaining amount of the battery), the sampling rate determiner 154 may select a combination of lower sampling rates within a range satisfying Expression (20) by priority so as to offer the advantage to the amount of the power consumption.

If no combination exists in which the value of the evaluation function is higher than the predetermined threshold value S, the sampling rate determiner 154 detects a combination of the sampling rates in which the evaluation function has the highest value and determines the detected combination to be the combination of the sampling rates in the receiver units 91-1 to 91-N.

The sampling rate is determined for every receiver unit and the receiver units 91-1 to 91-N can have different sampling rates.

Instead of the determination of which is important the communication quality or the amount of power consumption, for example, the sampling rate determiner 154 may give priority to the amount of power consumption to select a combination of the sampling rates if the bit error rate (BER) is lower than a predetermined value, and may select a combination of the sampling rates in which the BER becomes as low as possible on the basis of the evaluation function if the BER is higher than the predetermined value.

In the above description, the sampling rate controller 155, first, sets the channel filter 106 so as to perform the sampling at the sampling points at available sampling rates and calculates the evaluation functions in the all the combinations of the sampling rates supported by the evaluation function calculator 153 from the yielded multiple responses. The sampling rate determiner 154, then, compares the evaluation functions with each other to determine the combination of the sampling rates in the receiver units 91-1 to 91-N. However, the following process may be performed. First, the sampling rate controller 155 performs the sampling in a first combination of the available sampling rates and the evaluation function calculator 153 calculates the evaluation function in the first combination of the sampling rates from the yielded responses. Next, the sampling rate controller 155 performs the sampling in a second combination of available sampling rates and the evaluation function calculator 153 calculates the evaluation function in the second combination of the sampling rates from the yielded responses. Similarly, the sampling rate controller 155 sequentially performs the sampling in combinations of the available sampling rates and the evaluation function calculator 153 calculates the evaluation functions in the respective combinations of the sampling rates from the yielded responses. After the above calculations, the sampling rate determiner 154 compares the evaluation functions with each other to determine the combination of the sampling rates.

Both in the DS/SS signals and in the OFDM signals, performing the sampling at different points at different sampling rates can achieve superior characteristics, as described above.

For example, when the sampling rate is switched between one sample per symbol and four samples per symbol, the possibility of making more superior responses at either sampling rate is increased if the sampling points at the sampling rate of one sample per symbol completely differ from the sampling points at the sampling rate of four samples per symbol. In other words, the channel responses are acquired at the sampling points at the respective sampling rates to calculate the evaluation functions in combinations of the sampling points in order to determine which sampling rate is used in the reception of signals, the sampling rate of one sample per symbol or the sampling rate of four samples per symbol. Accordingly, it is preferred that the sampling points at the sampling rate of one sample per symbol differ from the sampling points at the sampling rate of four samples per symbol in one channel filter 106 because the difference in the sampling points increases the possibility of including the sampling points exhibiting more superior responses in the sampling points at either sampling rate.

In other words, for example, if some of the sampling points at the sampling rate of one sample per symbol coincide with some of the sampling points at the sampling rate of four samples per symbol when the sampling rate is switched between one sample per symbol and four samples per symbol, or if the sampling points at the sampling rate of two samples per symbol are included in the sampling points at the sampling rate of four samples per symbol when the sampling rate is switched between two samples per symbol and four samples per symbol, the BER characteristics achieved when the switching between the sampling rates is performed are equal to the more superior BER characteristics achieved at either sampling rate when the switching between the sampling rates is not performed. However, if the sampling points at one sampling rate differ from the sampling points at the other sampling rate, BER characteristics more superior than the more superior characteristics achieved at either sampling rate when the switching between the sampling rates is not performed are achieved in most cases.

In the reception of signals with multiple antennas, an increase in the number of antennas improves the reception characteristics but makes it difficult to reduce the size of the receiver units provided in a receiver apparatus or an information processing apparatus. However, according to the embodiments of the present invention, in the reception of signals with multiple antennas, even the use of antennas of a predetermined number without increasing the number of antennas can improve the reception characteristics, compared with cases where the sampling is performed at the sampling rate of one sample per symbol. In addition, the power consumption can be reduced, compared with cases where one symbol is oversampled. It is also possible to reduce the size of the receiver units provided in a receiver apparatus or an information processing apparatus both in the MIMO system and in the SIMO system.

Figure 21:
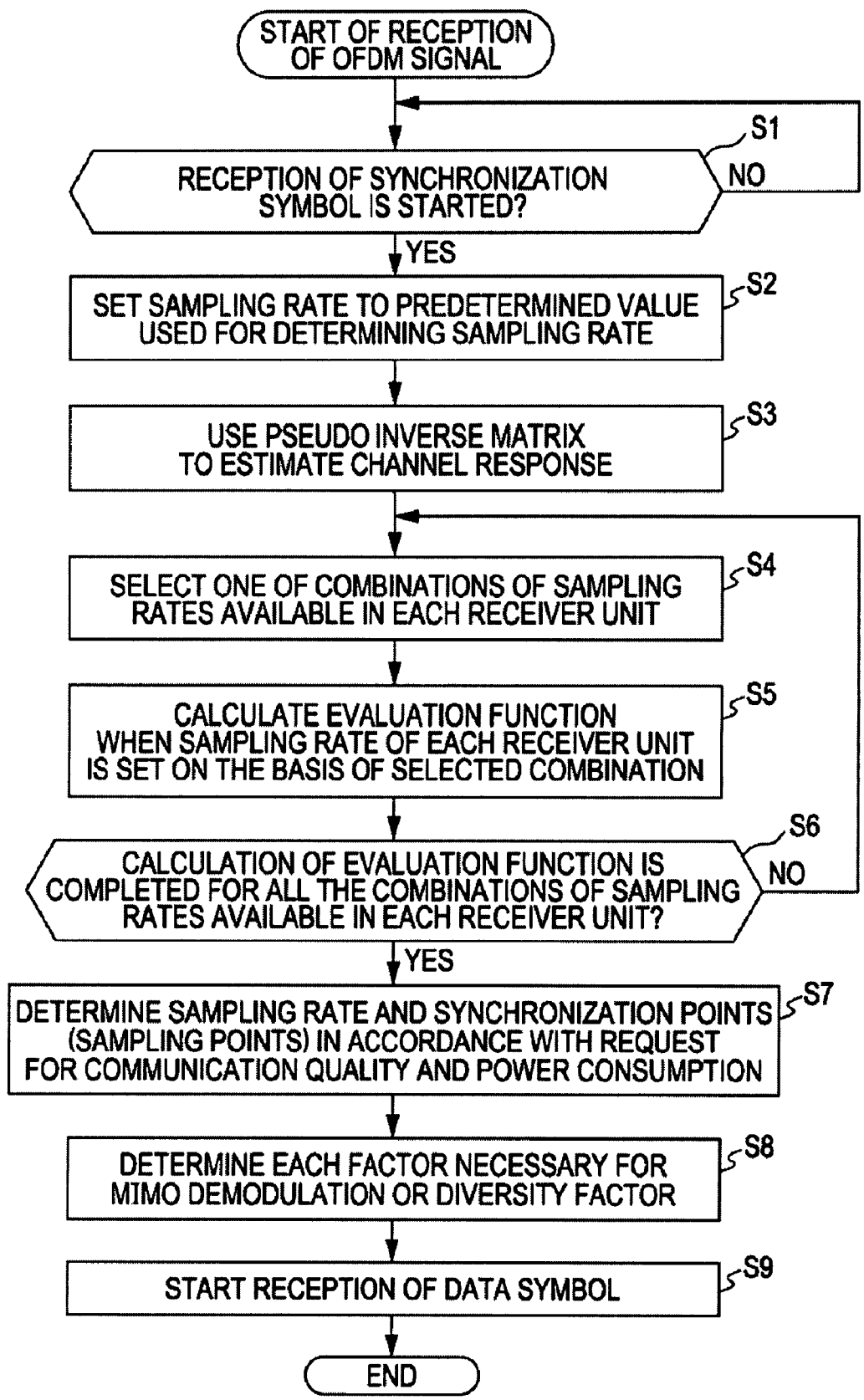
FIG. 21 is a flowchart showing an example of a reception process at reception of OFDM signals according to an embodiment of the present invention.

FIG. 21 is a flowchart showing an example of a reception process at reception of OFDM signals according to an embodiment of the present invention.

In Step S1, the channel response estimation unit 107 determines whether reception of a synchronization symbol is started. If the channel response estimation unit 107 determines that reception of a synchronization symbol is not started, the channel response estimation unit 107 repeats Step S1 to wait for the start of reception of a synchronization symbol.

If the channel response estimation unit 107 determines in Step S1 that reception of a synchronization symbol is started, in Step S2, the sampling rate controller 155 in the channel response estimation unit 107 sets the channel filter 106 in each of the receiver units 91-1 to 91-N so as to perform the sampling at the sampling points at available sampling rates and sets the sampling rates to predetermined values used for determining the sampling rates.

In Step S3, the channel signal acquirer 151 acquires a channel signal from each of the receiver units 91-1 to 91-N, and the response estimator 152 uses the pseudo inverse matrix, for example, calculates Equations (18) and (19), to estimate responses at the sampling points at the respective sampling rates. The response estimator 152 supplies the estimated responses to the evaluation function calculator 153.

In Step S4, the evaluation function calculator 153 selects one combination of sampling rates for which the calculation of the evaluation function is not completed from the combinations of the sampling rates available in the multiple receiver units 91-1 to 91-N.

In Step S5, the evaluation function calculator 153 uses, for example, Expression (20) to calculate the evaluation function when the sampling rate in each of the receiver units 91-1 to 91-N is set on the basis of the selected combination.

In Step S6, the evaluation function calculator 153 determines whether the calculation of the evaluation function is completed for all the combinations of the sampling rates available in the multiple receiver units 91-1 to 91-N. If the evaluation function calculator 153 determines that the calculation of the evaluation function is not completed for all the combinations of the available sampling rates, the flow goes back to Step S4 to repeat the above steps.

If the evaluation function calculator 153 determines in Step S6 that the calculation of the evaluation function is completed for all the combinations of the available sampling rates, in Step S7, the sampling rate determiner 154 determines the sampling rate and the synchronization points (sampling points) in each of the receiver units 91-1 to 91-N in accordance with a request for the communication quality and a request for the power consumption.

Specifically, in a situation in which the communication quality is most important, the sampling rate determiner 154 may detect a combination of the sampling rates in which the evaluation function has the highest value and may determine the detected combination to be the combination of the sampling rates in the receiver units 91-1 to 91-N.

In a situation in which the amount of power consumption is more important than the communication quality (for example, depending on conditions including the capacity of the battery in an apparatus and the remaining amount of the battery), the sampling rate determiner 154 may select a combination of lower sampling rates within a range satisfying Expression (20) by priority so as to offer the advantage to the amount of the power consumption.

If no combination exists in which the value of the evaluation function is higher than the predetermined threshold value S, the sampling rate determiner 154 detects a combination of the sampling rates in which the evaluation function has the highest value and determines the detected combination to be the combination of the sampling rates in the receiver units 91-1 to 91-N.

Instead of the determination of which is important the communication quality or the amount of power consumption, for example, the sampling rate determiner 154 may give priority to the amount of power consumption to select a combination of the sampling rates if the BER is lower than a predetermined value, and may select a combination of the sampling rates in which the BER becomes as low as possible on the basis of the evaluation function if the BER is higher than the predetermined value.

In Step S8, the demodulation controller 156 determines each factor necessary for the MIMO demodulation or a diversity factor on the basis of the result of the estimated responses at the determined sampling rates and controls the signal combination-demodulation unit 108 so as to set the values of the factors.

Specifically, if the transmitter apparatus has multiple antennas, that is, if the transmission and reception system adapts the MIMO, the demodulation controller 156 analyzes a pilot signal among the received signals, which is transmitted along with data and to which the symbol specific to each system is allocated, to determine the factors necessary for the signal separation and the demodulation in the signal combination-demodulation unit 108 and controls the signal separation and the demodulation. If the transmitter apparatus has one antenna, that is, if the transmission and reception system adapts the SIMO, the demodulation controller 156 determines the diversity factor at the reception of the OFDM signals and controls the diversity combination.

In Step S9, the channel response estimation unit 107 controls the channel filter 106 in each of the receiver units 91-1 to 91-N so as to set the determined sampling rate and sampling points, samples the received signal, and starts reception of data symbols. Then, the process terminates.

At reception of signals with multiple antennas, a combination of sampling rates can be determined so as to satisfy the requests for the reception characteristics and the amount the power consumption as much as possible on the basis of the calculation result of the evaluation function in the manner described above. Accordingly, it is possible to reduce the power consumption, compared with cases where one symbol is oversampled, and it is possible to achieve more superior reception characteristics, compared with cases where one sample is sampled per symbol.

Figure 22:
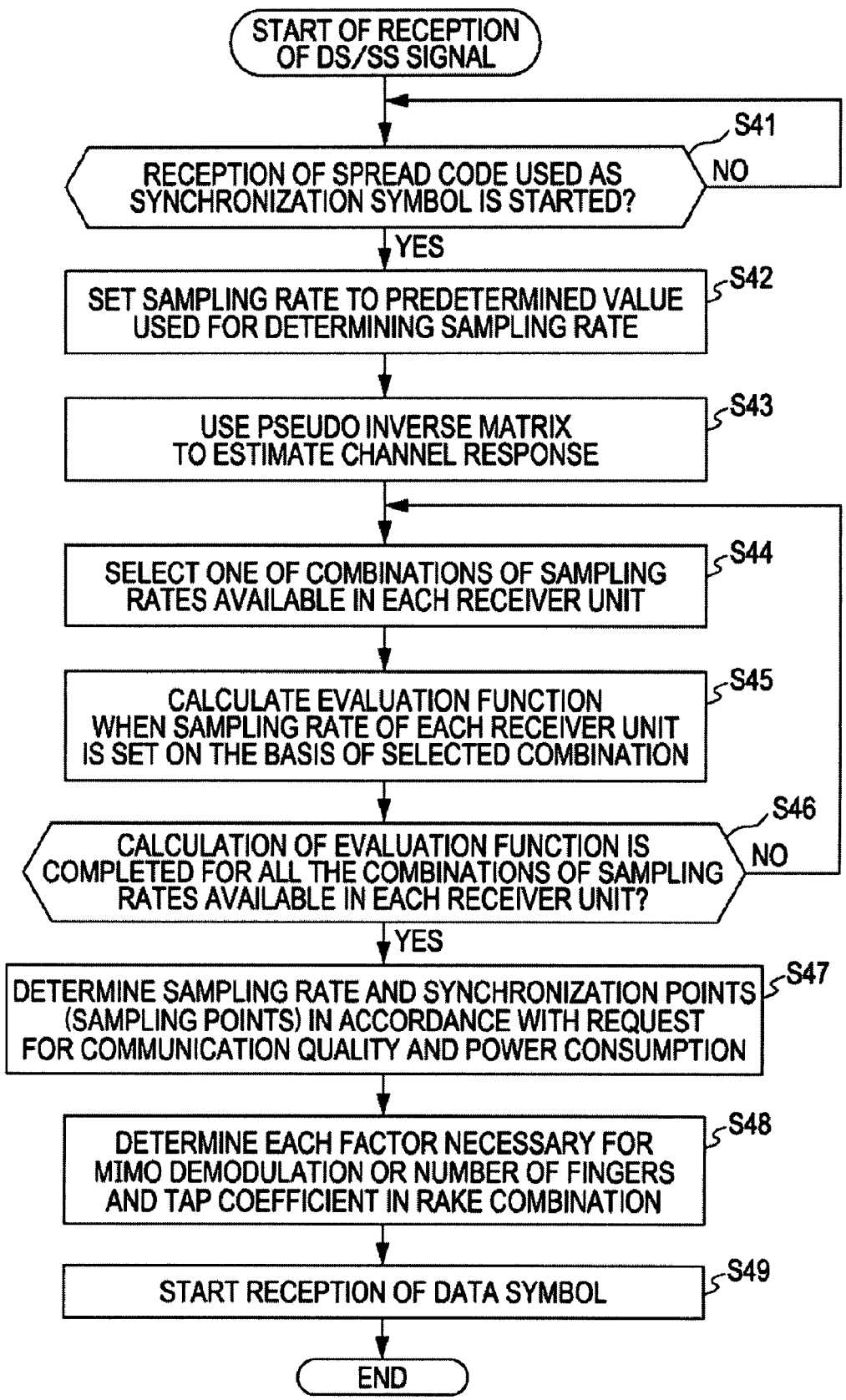
FIG. 22 is a flowchart showing an example of a reception process at reception of DS/SS signals according to an embodiment of the present invention.

FIG. 22 is a flowchart showing an example of a reception process at reception of DS/SS signals according to an embodiment of the present invention.

In Step S41, the channel response estimation unit 107 determines whether reception of a spread code used as a synchronization symbol is started. If the channel response estimation unit 107 determines that reception of a spread code is not started, the channel response estimation unit 107 repeats Step S41 to wait for the start of reception of a spread code.

If the channel response estimation unit 107 determines in Step S41 that reception of a spread code is started, in Step S42, the sampling rate controller 155 in the channel response estimation unit 107 sets the channel filter 106 in each of the receiver units 91-1 to 91-N so as to perform the sampling at the sampling points at available sampling rates and sets the sampling rates to predetermined values used for determining the sampling rates.

In Step S43, the channel signal acquirer 151 acquires a channel signal from each of the receiver units 91-1 to 91-N, and the response estimator 152 uses the pseudo inverse matrix, for example, calculates Equations (7) to (17), to estimate channel responses at the sampling points at the respective sampling rates. The response estimator 152 supplies the estimated channel responses to the evaluation function calculator 153.

In Step S44, the evaluation function calculator 153 selects one combination of sampling rates for which the calculation of the evaluation function is not completed from the combinations of the sampling rates available in the multiple receiver units 91-1 to 91-N.

In Step S45, the evaluation function calculator 153 uses, for example, Expression (20) to calculate the evaluation function when the sampling rate in each of the receiver units 91-1 to 91-N is set on the basis of the selected combination.

In Step S46, the evaluation function calculator 153 determines whether the calculation of the evaluation function is completed for all the combinations of the sampling rates available in the multiple receiver units 91-1 to 91-N. If the evaluation function calculator 153 determines that the calculation of the evaluation function is not completed for all the combinations of the available sampling rates, the flow goes back to Step S44 to repeat the above steps.

If the evaluation function calculator 153 determines in Step S46 that the calculation of the evaluation function is completed for all the combinations of the available sampling rates, in Step S47, the sampling rate determiner 154 determines the sampling rate and the synchronization points (sampling points) in each of the receiver units 91-1 to 91-N in accordance with a request for the communication quality and a request for the power consumption.

Specifically, in a situation in which the communication quality is most important, the sampling rate determiner 154 may detect a combination of the sampling rates in which the evaluation function has the highest value and may determine the detected combination to be the combination of the sampling rates in the receiver units 91-1 to 91-N. In a situation in which the amount of power consumption is more important than the communication quality, the sampling rate determiner 154 may select a combination of lower sampling rates within a range satisfying Expression (20) by priority so as to offer the advantage to the amount of the power consumption.

If no combination exists in which the value of the evaluation function is higher than the predetermined threshold value S, the sampling rate determiner 154 detects a combination of the sampling rates in which the evaluation function has the highest value and determines the detected combination to be the combination of the sampling rates in the receiver units 91-1 to 91-N. Instead of the determination of which is important the communication quality or the amount of power consumption, for example, the sampling rate determiner 154 may give priority to the amount of power consumption to select a combination of the sampling rates if the BER is lower than a predetermined value, and may select a combination of the sampling rates in which the BER becomes as low as possible on the basis of the evaluation function if the BER is higher than the predetermined value.

In Step S48, the demodulation controller 156 determines each factor necessary for the MIMO demodulation or the number of fingers and the tap coefficient in the RAKE combination on the basis of the result of the estimated responses at the determined sampling rates and controls the signal combination-demodulation unit 108 so as to set the values.

Specifically, if the transmitter apparatus has multiple antennas, that is, if the transmission and reception system adapts the MIMO, the demodulation controller 156 analyzes a pilot signal transmitted along with data to determine the factors necessary for the signal combination and the demodulation in the signal combination-demodulation unit 108 and controls the signal combination and the demodulation. If the transmitter apparatus has one antenna, that is, if the transmission and reception system adapts the SIMO, the demodulation controller 156 determines the number of fingers and the tap coefficient in the RAKE combination at the reception of the DS/SS signals and controls the RAKE combination.

In Step S49, the channel response estimation unit 107 controls the channel filter 106 in each of the receiver units 91-1 to 91-N so as to set the determined sampling rate and sampling points, samples the received signal, and starts reception of data symbols. Then, the process terminates.

At reception of signals with multiple antennas, a combination of sampling rates can be determined so as to satisfy the requests for the reception characteristics and the amount of the power consumption as much as possible on the basis of the calculation result of the evaluation function in the manner described above. Accordingly, it is possible to reduce the power consumption, compared with cases where one symbol is oversampled, and it is possible to achieve more superior reception characteristics, compared with cases where one sample is sampled per symbol.

The series of processing described above may be executed by software. The programs composing the software are installed from, for example, a recording medium to a computer incorporated in dedicated hardware or to a general-purpose personal computer capable of executing various functions by installing the various programs. In this case, for example, the receiver apparatus 81 described above with reference to FIG. 4 is a personal computer 301 shown in FIG. 23.

Figure 23:
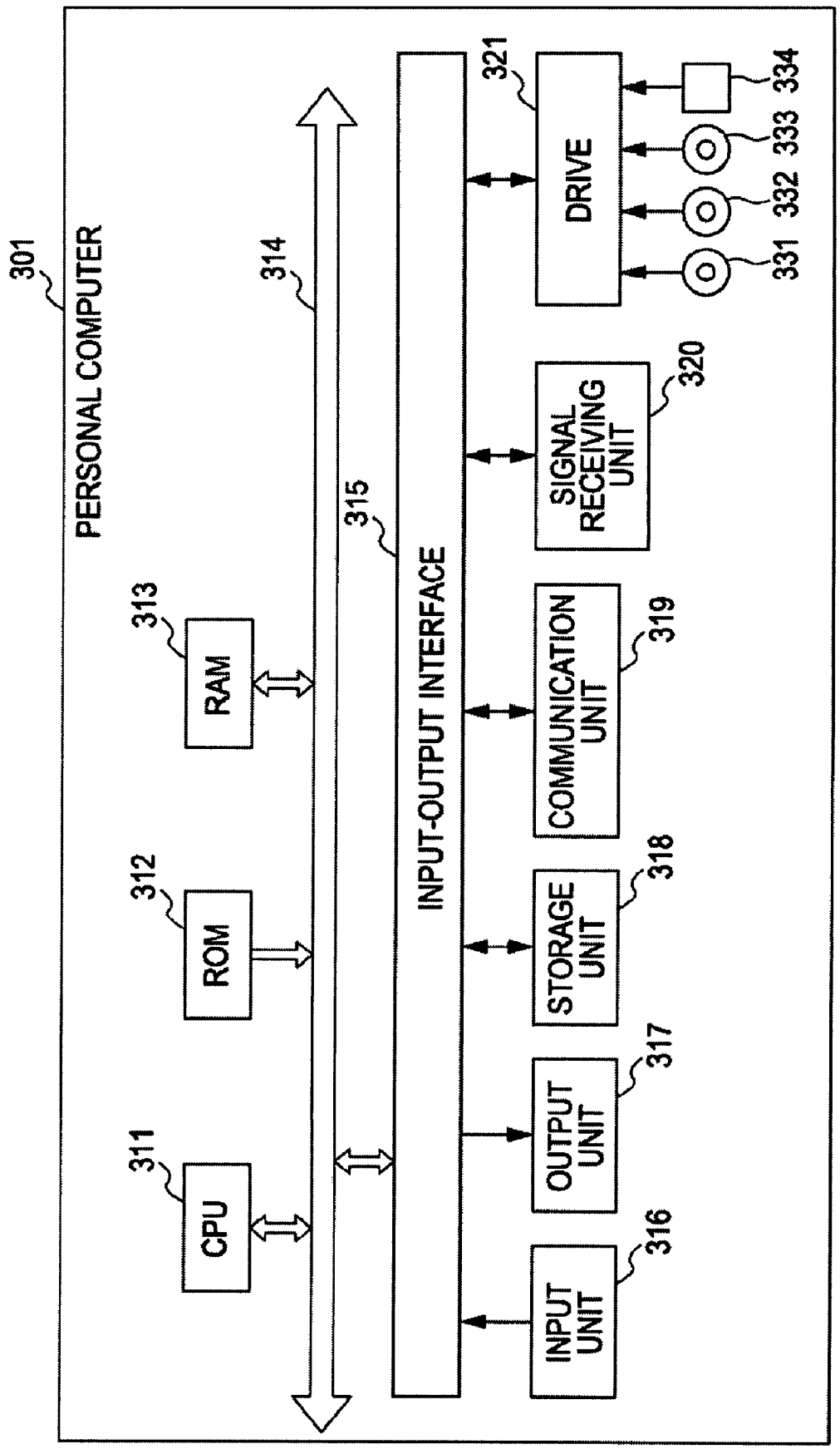
FIG. 23 is a block diagram showing an example of the configuration of a personal computer according to an embodiment of the present invention.

Referring to FIG. 23, a central processing unit (CPU) 311 executes a variety of processing in accordance with programs stored in a read only memory (ROM) 312 or programs loaded from a storage unit 318 to a random access memory (RAM) 313. Data necessary for the CPU 311 to execute the variety of processing is also stored in the RAM 313.

The CPU 311, the ROM 312, and the RAM 313 are connected to each other via a bus 314. An input-output interface 315 is also connected to the bus 314.

An input unit 316, an output unit 317, the storage unit 318, a communication unit 319, and a signal receiving unit 320 are connected to the input-output interface 315. The input unit 316 includes a keyboard and a mouse. The output unit 317 includes a display device and a speaker. The storage unit 318 includes, for example, a hard disk. The communication unit 319 includes a modem and a terminal adaptor. The communication unit 319 performs communication via a network, such as the Internet.

The signal receiving unit 320 includes the antenna 101, the BPF 102, the LNA 103, the splitter 104, the ΔΣ A/D converters 105, and the channel filter 106 described above with reference to FIG. 4 or is capable of performing the function of the above components. The signal receiving unit 320 performs the above processing under the control of the CPU 311 having the function of the channel response estimation unit 107 described above with reference to FIG. 6. The CPU 311 may function as the signal combination-demodulation unit 108 or the signal receiving unit 320 may function as the signal combination-demodulation unit 108.

A drive 321 is also connected to the input-output interface 315, if necessary. A magnetic disk 331, an optical disk 332, a magneto-optical disk 333, or a semiconductor memory 334 is loaded in the drive 321. Computer-executable programs read out from the magnetic disk 331, the optical disk 332, the magneto-optical disk 333, or the semiconductor memory 334 are installed in the storage unit 318, if necessary.

In order to execute the series of processing by software, the programs composing the software are installed over a network or from a recording medium to a computer incorporated in dedicated hardware or to a general-purpose personal computer capable of executing various functions by installing the various programs.

The recording medium may be a package medium, such as the magnetic disk 331 (including a flexible disk), the optical disk 332 (including a compact disc-read only memory (CD-ROM) and a digital versatile disk (DVD)), the magneto-optical disk 333 (including a MINIDISC (MD) (Registered trademark of SONY CORPORATION), or the semiconductor memory 334, shown in FIG. 23. The package medium is separated from the personal computer 301, has programs stored therein, and is delivered to a user for supplying the programs. The recording medium may be the ROM 312 having programs stored therein or the hard disk in the storage unit 318, which is incorporated in the personal computer 301.

The steps describing the programs recorded in the recording medium may be performed in time series in the described order or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A receiver apparatus comprising:
a plurality of signal receiving means;
a plurality of channel signal outputting means for sampling signals received by the plurality of signal receiving means at sampling rates switched within a predetermined range or between multiple values and outputting channel signals;
control means for controlling the sampling rates in the plurality of channel signal outputting means;
response estimating means for estimating responses on the basis of the channel signals output from the plurality of channel signal outputting means;
evaluating means for evaluating reception characteristics on the basis of the responses estimated by the response estimating means; and
determining means for determining the sampling rates in the plurality of channel signal outputting means on the basis of the reception characteristics at the multiple sampling rates evaluated by the evaluating means.

2. The receiver apparatus according to claim 1,
wherein, during a period when secondary information necessary for receiving main information is received before the main information is received, the control means controls the sampling rates in the plurality of channel signal outputting means so that the response estimating means estimates the responses at the multiple sampling rates, the response estimating means estimates the responses at the multiple sampling rates in the plurality of channel signal outputting means, the evaluating means evaluates the reception characteristics on the basis of the responses at the multiple sampling rates in the plurality of channel signal outputting means, and the determining means determines a predetermined sampling rate at which each channel signal outputting means samples a signal corresponding to the main information, on the basis of the reception characteristics evaluated by the evaluating means, and wherein, during a period when the main information is received, the control means controls the sampling rates in the plurality of channel signal outputting means so as to be the predetermined sampling rates.

3. The receiver apparatus according to claim 1, wherein the signals are sampled at different sampling points at the different sampling rates in the plurality of channel signal outputting means.

4. The receiver apparatus according to claim 2, wherein the evaluating means evaluates the reception characteristics in all the combinations of the multiple sampling rates in the plurality of channel signal outputting means, and wherein the determining means determines a predetermined combination of the sampling rates in which the plurality of channel signal outputting means sample the signals corresponding to the main information on the basis of the reception characteristics evaluated by the evaluating means in all the combinations of the multiple sampling rates in the plurality of channel signal outputting means.

5. The receiver apparatus according to claim 4, wherein the determining means determines a combination of the sampling rates having the highest evaluation value, among the values of the reception characteristics evaluated by the evaluating means in all the combinations of the multiple sampling rates in the plurality of channel signal outputting means, to be the combination of the sampling rates in which the plurality of channel signal outputting means sample the signals corresponding to the main information.

6. The receiver apparatus according to claim 4, wherein the determining means compares the values of the reception characteristics in all the combinations of the multiple sampling rates in the plurality of channel signal outputting means, evaluated by the evaluating means, with a predetermined threshold value, and determines a combination having the smallest amount of power consumption, among the combinations providing the evaluated values higher than the predetermined value, to be the combination of the sampling rates in which the plurality of channel signal outputting means sample the signals corresponding to the main information.

7. The receiver apparatus according to claim 1, wherein each channel signal outputting means includes
    analog-to-digital converting means for oversampling the received signal and converting the signal into a digital signal; and
    rate varying means for varying a rate of the digital signal resulting from the conversion by the analog-to-digital converting means and outputting the channel signal at the sampling rate controlled by the control means.

8. The receiver apparatus according to claim 1, further comprising:

demodulating means for demodulating the received signals on the basis of the responses estimated by the response estimating means.

9. The receiver apparatus according to claim 8, further comprising:

combination control means for controlling the number of fingers and a tap coefficient in RAKE combination on the basis of the responses estimated by the response estimating means.

10. The receiver apparatus according to claim 8, wherein the demodulating means separates multiple signals transmitted through multiple antennas to demodulate the separated signals.

11. The receiver apparatus according to claim 8, further comprising:

combination control means for controlling a diversity factor on the basis of the responses estimated by the response estimating means.

12. A receiving method for a receiver apparatus receiving signals with a plurality of signal receiving means including different antennas, the method comprising the steps of, during a period when signals corresponding to secondary information necessary for receiving main information are received before the main information is received:

sampling the received signals corresponding to the secondary information, received through the antennas in the plurality of signal receiving means, at multiple sampling rates controlled so as to estimate responses at the multiple sampling rates;

estimating the responses of the received signals corresponding to the secondary information sampled at the multiple sampling rates;

evaluating reception characteristics at the multiple sampling rates of the received signals received by the plurality of signal receiving means on the basis of the estimated responses at the multiple sampling rates; and determining a predetermined sampling rate at which each signal receiving means samples the signal corresponding to the main information, on the basis of the evaluated reception characteristics, and the method comprising the steps of, during a period when signals corresponding to the main information are received:

controlling the sampling rates at which the received signals corresponding to the main information are sampled so as to be the predetermined sampling rates determined for every signal receiving means; and sampling the received signals corresponding to the main information, received through the multiple antennas in the plurality of signal receiving means, at the predetermined sampling rates.

13. A non-transitory computer readable storage medium encoded with a computer-executable program for controlling processing of received signals, the program comprising the steps of, during a period when signals corresponding to secondary information necessary for receiving main information are received before the main information is received:

controlling sampling of the received signals corresponding to the secondary information, received through multiple antennas in a plurality of signal receiving means, at multiple sampling rates controlled so as to estimate responses at the multiple sampling rates;

estimating the responses of the received signals corresponding to the secondary information sampled at the multiple sampling rates;

evaluating reception characteristics at the multiple sampling rates of the received signals received by the plurality of signal receiving means on the basis of the estimated responses at the multiple sampling rates; and determining a predetermined sampling rate at which each signal receiving means samples the signal corresponding to the main information on the basis of the evaluated reception characteristics, and the program comprising the steps of, during a period when signals corresponding to the main information are received:

controlling the sampling rates at which the received signals corresponding to the main information are sampled so as to be the predetermined sampling rates determined for every signal receiving means; and controlling sampling of the received signals corresponding to the main information, received through the multiple antennas in the plurality of signal receiving means, at the predetermined sampling rates.

14. A non-transitory recording medium having the program according to claim 13 recorded thereon.

15. A receiver apparatus comprising:

a plurality of signal receiving units;

a plurality of channel signal outputting units that samples signals received by the plurality of signal receiving units at sampling rates switched within a predetermined range or between multiple values and outputs channel signals;

a control unit that controls the sampling rates in the plurality of channel signal outputting units;

a response estimating unit that estimates responses on the basis of the channel signals output from the plurality of channel signal outputting units;

an evaluating unit that evaluates reception characteristics on the basis of the responses estimated by the response estimating unit; and a determining unit that determines the sampling rates in the plurality of channel signal outputting units on the basis of the reception characteristics at the multiple sampling rates evaluated by the evaluating unit.

\* \* \* \* \*